United States Patent
Anderson et al.

(10) Patent No.: US 8,804,605 B2
(45) Date of Patent: *Aug. 12, 2014

(54) FEEDER LINK CONFIGURATIONS TO SUPPORT LAYERED MODULATION FOR DIGITAL SIGNALS

(75) Inventors: Paul R. Anderson, Hermosa Beach, CA (US); Joseph Santoru, Agoura Hills, CA (US); Ernest C. Chen, San Pedro, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/600,883

(22) Filed: Aug. 31, 2012

(65) Prior Publication Data

US 2013/0121430 A1 May 16, 2013

Related U.S. Application Data

(60) Division of application No. 12/190,526, filed on Aug. 12, 2008, now Pat. No. 8,259,641, which is a division of application No. 10/532,631, filed as application No. PCT/US03/33255 on Oct. 20, 2003, now Pat. No. 7,423,987, which is a continuation-in-part of application No. 09/844,401, filed on Apr. 27, 2001, now Pat. No. 7,209,524.

(60) Provisional application No. 60/421,328, filed on Oct. 25, 2002.

(51) Int. Cl.
H04B 7/185 (2006.01)

(52) U.S. Cl.
USPC ........... 370/316; 370/319; 370/320; 370/321; 370/322; 370/325; 370/327; 370/328; 370/329; 370/336; 370/339; 455/422.1; 455/427; 455/428; 455/429; 455/431; 375/261; 375/298; 375/308; 375/316; 375/320; 375/327; 332/103; 329/304

(58) Field of Classification Search
USPC ......... 370/316, 319–322, 325, 327–329, 336, 370/339; 455/422, 427–429, 431; 329/304; 332/103; 375/261, 298, 308, 316, 320, 375/327

See application file for complete search history.

(56) References Cited

U.S. PATENT DOCUMENTS

| | | | |
|---|---|---|---|
| 5,555,257 A * | 9/1996 | Dent | 370/319 |
| 5,974,316 A * | 10/1999 | Tayloe et al. | 455/429 |
| 6,657,978 B1 * | 12/2003 | Millman | 370/316 |
| 7,151,807 B2 | 12/2006 | Chen | |
| 7,173,977 B2 | 2/2007 | Chen et al. | |
| 7,173,981 B1 | 2/2007 | Chen et al. | |
| 7,184,473 B2 | 2/2007 | Chen et al. | |
| 7,184,489 B2 | 2/2007 | Wang et al. | |
| 7,209,524 B2 | 4/2007 | Chen | |
| 7,230,480 B2 | 6/2007 | Chen et al. | |
| 7,245,671 B1 | 7/2007 | Chen et al. | |
| 7,418,060 B2 | 8/2008 | Chen et al. | |

(Continued)

*Primary Examiner* — Steve D Agosta

(57) ABSTRACT

Systems and methods are disclosed for feeder link configurations to layered modulation. One feeder link system employs feeder link spot beam to antennas in distinct coverage areas to enable frequency reuse. Another system employs narrow beam width feeder link antenna to illuminate individual satellites also enabling frequency reuse. Yet another system uses layered modulation in the feeder link. Another feeder link system employs a higher order synchronous modulation for the satellite feeder link than is used in the layered modulation downlink signals.

28 Claims, 24 Drawing Sheets

(56) References Cited

U.S. PATENT DOCUMENTS

| | | |
|---|---|---|
| 7,426,243 B2 | 9/2008 | Chen et al. |
| 7,426,246 B2 | 9/2008 | Chen et al. |
| 7,463,676 B2 | 12/2008 | Chen |
| 7,469,019 B2 | 12/2008 | Wang et al. |
| 7,471,735 B2 | 12/2008 | Chen |
| 7,474,710 B2 | 1/2009 | Chen et al. |
| 7,483,495 B2 | 1/2009 | Chen |
| 7,483,505 B2 | 1/2009 | Wang et al. |
| 7,502,429 B2 | 3/2009 | Chen |
| 7,502,430 B2 | 3/2009 | Chen |
| 7,512,189 B2 | 3/2009 | Chen et al. |
| 7,529,312 B2 | 5/2009 | Chen |
| 7,577,213 B2 | 8/2009 | Chen et al. |
| 7,583,728 B2 | 9/2009 | Chen et al. |
| 7,639,759 B2 | 12/2009 | Chen |
| 7,706,466 B2 | 4/2010 | Chen et al. |
| 7,738,587 B2 | 6/2010 | Chen et al. |
| 7,778,365 B2 | 8/2010 | Chen |
| 7,822,154 B2 | 10/2010 | Chen et al. |
| 7,920,643 B2 | 4/2011 | Chen |
| 8,005,035 B2 | 8/2011 | Chen |
| 8,130,818 B2 | 3/2012 | Chen |
| 8,208,526 B2 | 6/2012 | Chen et al. |
| 2009/0052590 A1 | 2/2009 | Chen |

\* cited by examiner

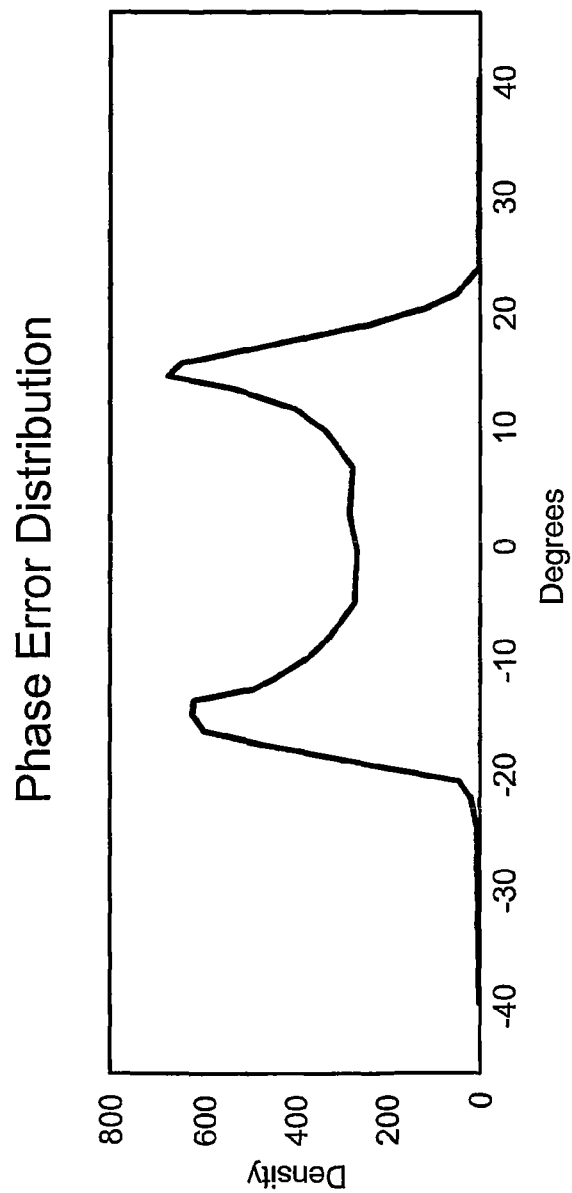

FEEDER LINK CONFIGURATIONS TO SUPPORT LAYERED MODULATION FOR DIGITAL SIGNALS

CROSS-REFERENCE TO RELATED APPLICATIONS

This application is a divisional of U.S. patent application Ser. No. 12/190,526, filed Aug. 12, 2008, by Paul Anderson et al., entitled "FEEDER LINK CONFIGURATIONS TO SUPPORT LAYERED MODULATION FOR DIGITAL SIGNALS," which is a divisional application of U.S. patent application Ser. No. 10/532,631, filed Apr. 25, 2005, by Paul Anderson et al., entitled "FEEDER LINK CONFIGURATIONS TO SUPPORT LAYERED MODULATION FOR DIGITAL SIGNALS," now issued as U.S. Pat. No. 7,423,987, which is the national phase application under 35 U.S.C. §371 of PCT International Application No. PCT/US03/33255 which has an International filing date of Oct. 20, 2003, which designated the United States of America and which claims benefit of U.S. Provisional Patent Application No. 60/421,328, filed Oct. 25, 2002, by Paul Anderson et al., entitled "FEEDER LINK CONFIGURATIONS TO SUPPORT LAYERED MODULATION FOR DIGITAL SIGNAL," and which is also a continuation-in-part application of U.S. patent application Ser. No. 09/844,401, filed Apr. 27, 2001, by Ernest C. Chen, entitled "LAYERED MODULATION FOR DIGITAL SIGNALS," now issued as U.S. Pat. No. 7,209,524, all of which are hereby incorporated be reference herein.

U.S. Utility application Ser. No. 10/305,490, filed Nov. 26, 2002, by Patrick J. Loner, entitled "SYSTEMS AND METHODS FOR SHARING UPLINK BANDWIDTH AMONG SATELLITES IN A COMMON ORBITAL SLOT," now issued as U.S. Pat. No. 7,068,975, is incorporated by reference herein.

BACKGROUND OF THE INVENTION

1. Field of the Invention

The present invention relates to systems and methods for feeder links for digital signals, particularly signals using layered modulations.

2. Description of the Related Art

Digital signal communication systems have been used in various fields, including digital TV signal transmission, either terrestrial or satellite. As the various digital signal communication systems and services evolve, there is a burgeoning demand for increased data throughput and added services. However, it is more difficult to implement either improvement in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate conventional 8PSK or 16QAM signals. As a result, legacy customers with QPSK receivers must upgrade their receivers in order to continue to receive any signals transmitted with an 8PSK or 16QAM modulation.

It is advantageous for systems and methods of transmitting signals to accommodate enhanced and increased data throughput without requiring additional frequency. In addition, it is advantageous for enhanced and increased throughput signals for new receivers to be backwards compatible with legacy receivers. There is further an advantage for systems and methods which allow transmission signals to be upgraded from a source separate from the legacy transmitter.

It has been proposed that a layered modulation signal, transmitting non-coherently (asynchronously) both upper and lower layer signals, can be employed to meet these needs.

Such layered modulation systems allow higher information throughput with backwards compatibility. Although, even when backward compatibility is not required (such as with an entirely new system), layered modulation can still be advantageous because it requires a TWTA peak power significantly lower than that for a conventional 8PSK or 16QAM modulation format for a given throughput.

Layered modulation efficiently uses bandwidth by transmitting interfering digital carriers on a downlink using saturated satellite high power amplifiers. However, if each carrier were transmitted via a feeder link (i.e. uplink) to the satellite in its own individual portion of bandwidth (i.e. not interfering), then the required feeder link bandwidth would be much more than the required downlink bandwidth.

Accordingly, there is a need for systems and methods for feeder link configurations to support layered modulation. The present invention meets these needs.

SUMMARY OF THE INVENTION

The present invention provides four distinct techniques that can be employed to support the use of layered modulation on a satellite downlink (See U.S. Utility application Ser. No. 09/844,401). Satellite communications bands are almost always allocated in pairs of substantially equal bandwidth—a feeder link (i.e. uplink) bandwidth and a corresponding downlink bandwidth. For example, in the case of the broadcasting satellite service (BSS) in one region, the feeder link is allocated at 17.3 to 17.8 GHz, and the corresponding downlink is allocated at 12.2 to 12.7 GHz.

Layered modulation efficiently uses bandwidth by transmitting interfering digital carriers using saturated satellite high power amplifiers. If each carrier were transmitted up to the satellite in its own individual portion of bandwidth (not interfering), then the required feeder link bandwidth would be much more than the downlink bandwidth. Accordingly, the present invention discloses systems and methods for satellite feeder links that utilize substantially the same or less feeder link bandwidth as the counterpart downlink bandwidth.

The use of feeder link spot beam antennas, the use of a narrow feeder link antenna beam width to illuminate individual satellites and the use of higher order synchronous modulation on the satellite feeder link have all been proposed in various places as mechanisms to feed broadcast signals up to a satellite. In these cases, however, feeder link spot beam antennas have not been proposed in combination with a non-coherently layered modulation downlink as with embodiments of the present invention.

In one embodiment of the invention a feeder link system includes a first receiver for receiving a first feeder link signal using a first feeder link spot beam antenna for a first satellite transponder. The first satellite transponder is for transmitting an upper layer signal of a layered modulation signal to at least one integrated receiver/decoder (IRD). The system includes a second receiver for receiving a second feeder link signal using a second feeder link spot beam antenna for a second satellite transponder. The second satellite transponder is for transmitting a lower layer signal of the layered modulation signal to the at least one IRD. The first feeder link spot beam antenna transmits from a first coverage area and the second feeder link spot beam antenna transmits from a second coverage area distinct from the first coverage area and the second feeder link signal reuses a frequency spectrum of the first feeder link signal.

In a second embodiment of the invention, a feeder link system includes a first receiver for receiving a first feeder link signal for a first satellite transponder on a first satellite. The first satellite transponder is for transmitting an upper layer signal of a layered modulation signal to at least one integrated receiver/decoder (IRD). The system further includes a second receiver for receiving a second feeder link signal for a second satellite transponder on a second satellite. The second satellite transponder transmitting a lower layer signal of the layered modulation signal to the at least one IRD. The second feeder link signal reuses a frequency band of the first feeder link signal and the first satellite and the second satellite have an orbital separation sufficient to allow reuse of the frequency band.

In a third embodiment of the invention, a feeder link system includes a layered modulation receiver/demodulator for demodulating an upper layer feeder link signal and a lower layer feeder link signal both from a layered modulation feeder link signal. A first modulator modulates the upper layer feeder link signal to produce an upper layer signal of a layered modulation downlink signal to at least one integrated receiver/decoder (IRD). A second modulator modulates the lower layer feeder link signal to produce a lower layer signal of the layered modulation downlink signal to the at least one IRD.

In a fourth embodiment of the invention, a feeder link system includes a higher-order modulation receiver/demodulator for receiving and demodulating a feeder link signal into a first bit stream and a demultiplexer for demultiplexing the first bit stream into a second bit stream and a third bit stream. A first lower order modulator modulates the first bit stream into an upper layer signal of a layered modulation signal for transmission to at least one integrated receiver/decoder (IRD). A second lower order modulator modulates the second bit stream into a lower layer signal of the layered modulation signal for transmission to the at least one IRD. The feeder link signal comprises a higher order modulation than a lower order modulation of the upper layer signal and the lower layer signal such that a feeder link frequency band of the feeder link signal is no greater than a downlink frequency band of the upper layer signal and the lower layer signal.

BRIEF DESCRIPTION OF THE DRAWINGS

Referring now to the drawings in which like reference numbers represent corresponding parts throughout:

FIGS. 7A-7C are diagrams illustrating a signal constellation of a second transmission layer over the first transmission layer after first layer demodulation;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

U.S. Utility application Ser. No. 09/844,401 describes a technique for transmitting digital information using multiple non-coherent carriers occupying overlapping portions of an RF band or channel. This technique is at its most efficient in a satellite transmission environment where each of the interfering carriers pass through a separate travelling wave tube amplifier (TWTA). Each amplifier (depending on the modulation type used for that carrier) can usually be operated at saturation, generally the most efficient use of such satellite-based TWTAs.

Sophisticated ground receivers that employ the technique described in U.S. Utility application Ser. No. 09/844,401 can demodulate each of these carriers where the frequency spectrum of one carrier can substantially or completely overlap the frequency spectrum used to transmit the other.

The conventional technique for transmitting each carrier to its respective satellite TWTA is to transmit each carrier in its own dedicated (non-interfering) portion of feeder link bandwidth. However, because the layered modulation technique uses interfering downlink carriers to gain considerable bandwidth efficiency, the amount of downlink bandwidth used is significantly less than that needed by the feeder links if this conventional technique is employed.

However, in almost all satellite communications bands allocated by the International Telecommunication Union Radiocommunications Sector (ITU-R), the allocation of bandwidth to the feeder link is equal to that allocated to the corresponding downlink. Without some scheme to get the carriers up to the satellite in the same amount of bandwidth used by the corresponding downlink, the downlink allocation could not be fully used.

This invention describes a number of techniques that can be employed to reduce the feeder link bandwidth requirement to no more than the bandwidth requirement of the downlink.

2. Video Distribution System

Figure 1:
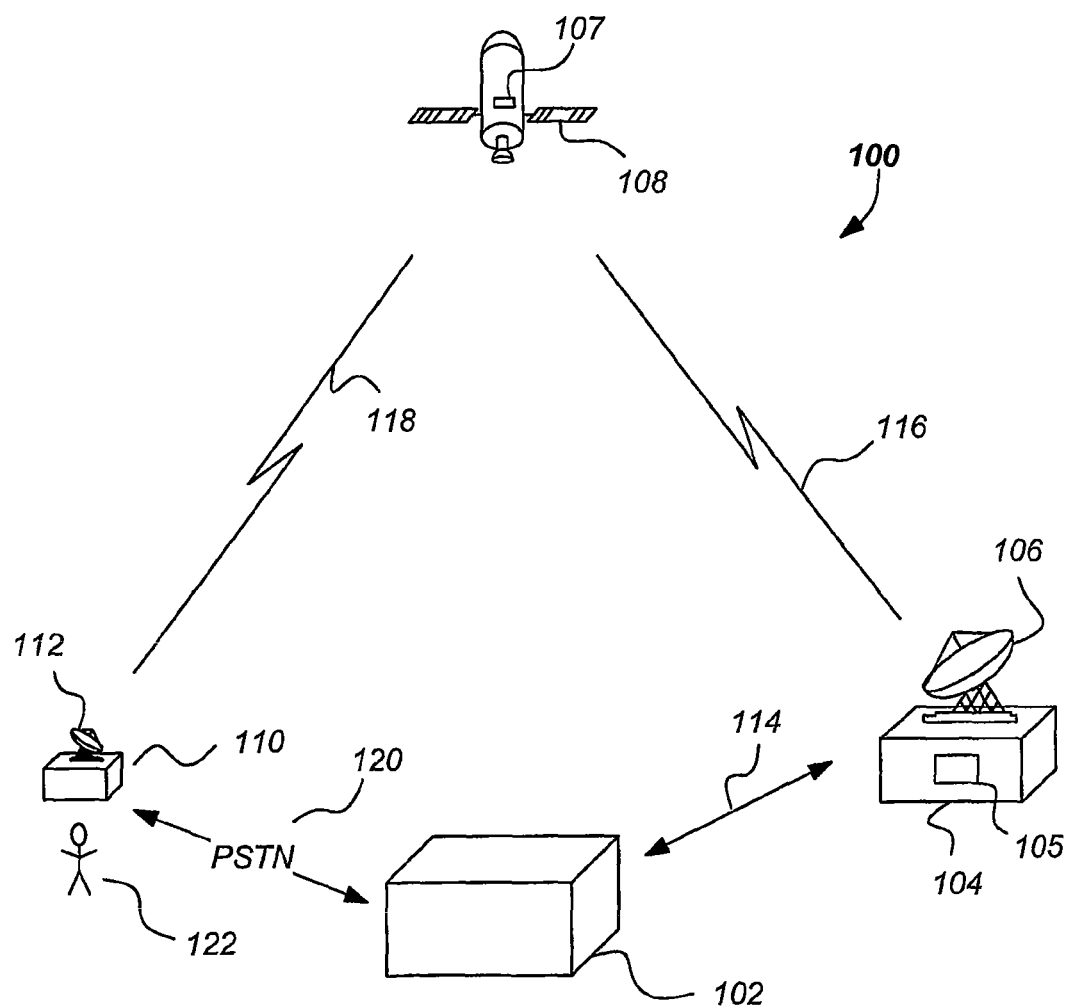
FIG. 1 is a diagram illustrating an overview of a single satellite video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108 via feeder link signal 116. The satellite 108 receives and processes this information, and transmits the video programs and control information to the subscriber receiver station 110 via downlink signal 118 using transmitter or transponder 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna.

The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

2.1 Uplink Configuration

Figure 2:
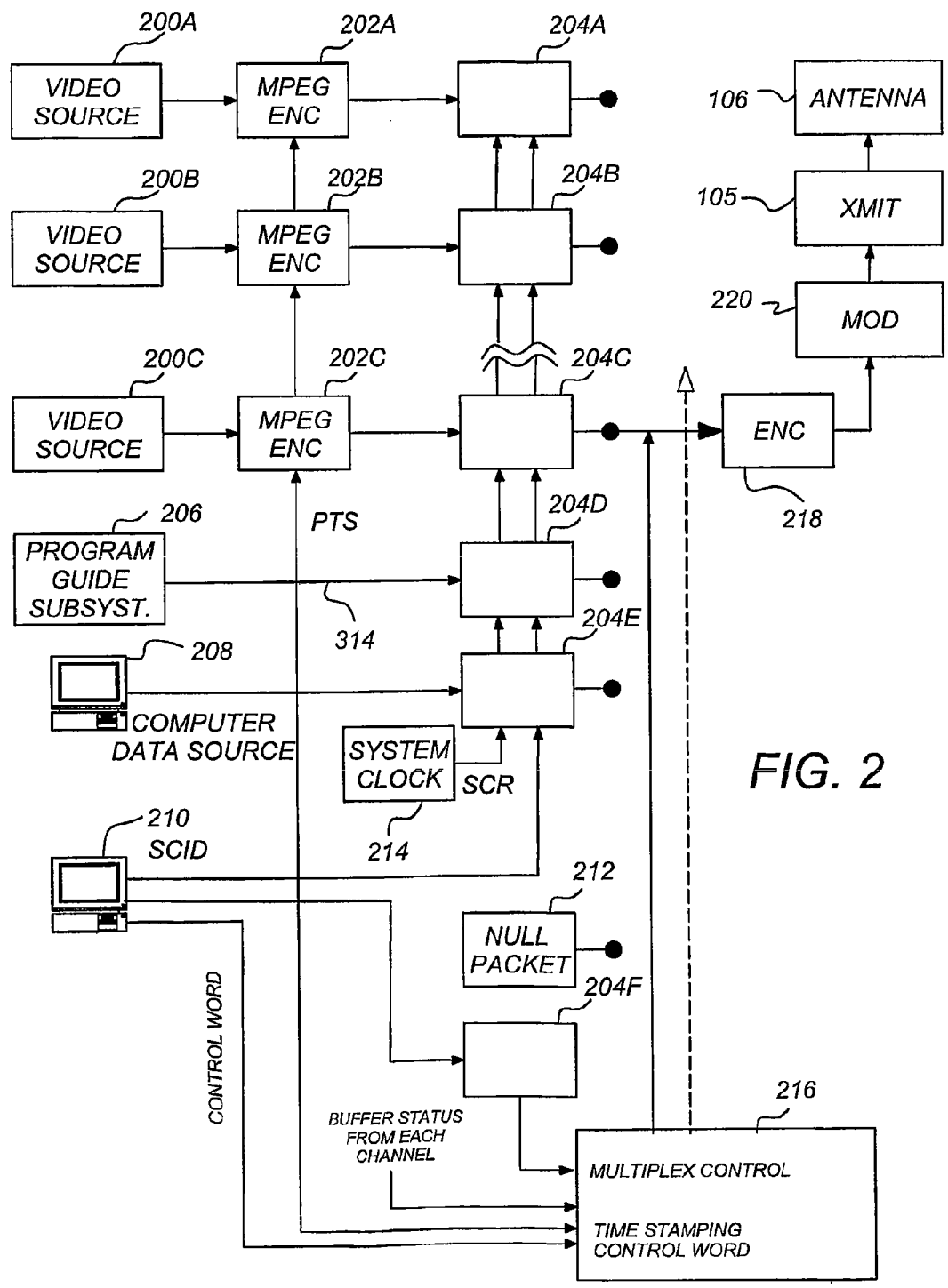
FIG. 2 is a block diagram showing a typical uplink configuration for a single satellite transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which may be augmented respectively with one or more audio channels for high fidelity music, soundtrack information, or a secondary audio program for transmitting foreign languages), a data channel from a program guide subsystem 206 and computer data information from a computer data source 208.

Typical video channels are provided by a program source 200A-200C of video material (collectively referred to hereinafter as program source(s) 200). The data from each program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each program source 200.

The output data packets are assembled using a reference from the system clock 214 (SCR), and from the conditional access manager 210, which provides the service channel identifier (SCID) to the packetizers 204 for use in generating the data packets. These data packets are then multiplexed into serial data and transmitted.

2.2 Broadcast Data Stream Format and Protocol

Figure 3A:
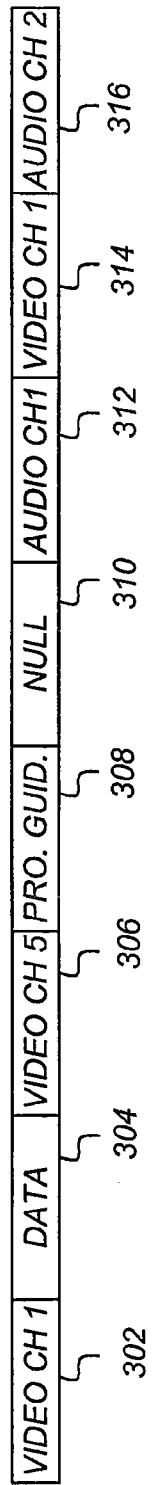
FIG. 3A is a diagram of a representative data stream.

FIG. 3A is a diagram of a representative data stream. The first packet 302 comprises information from video channel 1 (data coming from, for example, the first video program source 200A). The next packet 304 comprises computer data information that was obtained, for example from the computer data source 208. The next packet 306 comprises information from video channel 5 (from one of the video program sources 200). The next packet 308 comprises program guide information such as the information provided by the program guide subsystem 206. As shown in FIG. 3A, null packets 310 created by the null packet module 212 may be inserted into the data stream as desired followed by further data packets 312, 314, 316 from the program sources 200.

Referring back to FIG. 2, the data stream therefore comprises a series of packets (302-316) from any one of the data sources (e.g. program sources 200, program guide subsystem 206, computer data source 208) in an order determined by the controller 216. The data stream is encrypted by the encryption module 218, modulated by the modulator 220 (typically using a QPSK modulation scheme), and provided to the transmitter 105, which broadcasts the modulated data stream on a frequency bandwidth to the satellite via the antenna 106. The receiver 500 at the receiver station 110 receives these signals, and using the SCID, reassembles the packets to regenerate the program material for each of the channels.

Figure 3B:
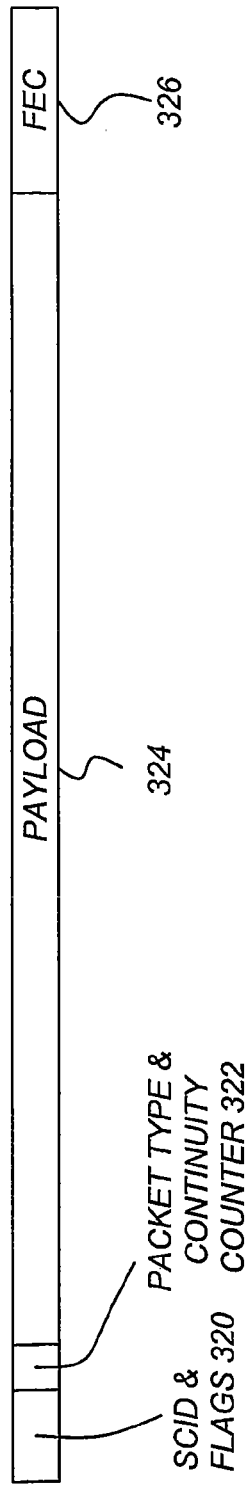
FIG. 3B is a diagram of a representative data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control other features. The second packet segment 322 is made up of a 4-bit packet type indicator and a 4-bit continuity counter. The packet type generally identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which in the cases of packets 302 or 306 is a portion of the video program provided by the video program source 200. The final packet segment 326 is data required to perform forward error correction.

Figure 4:
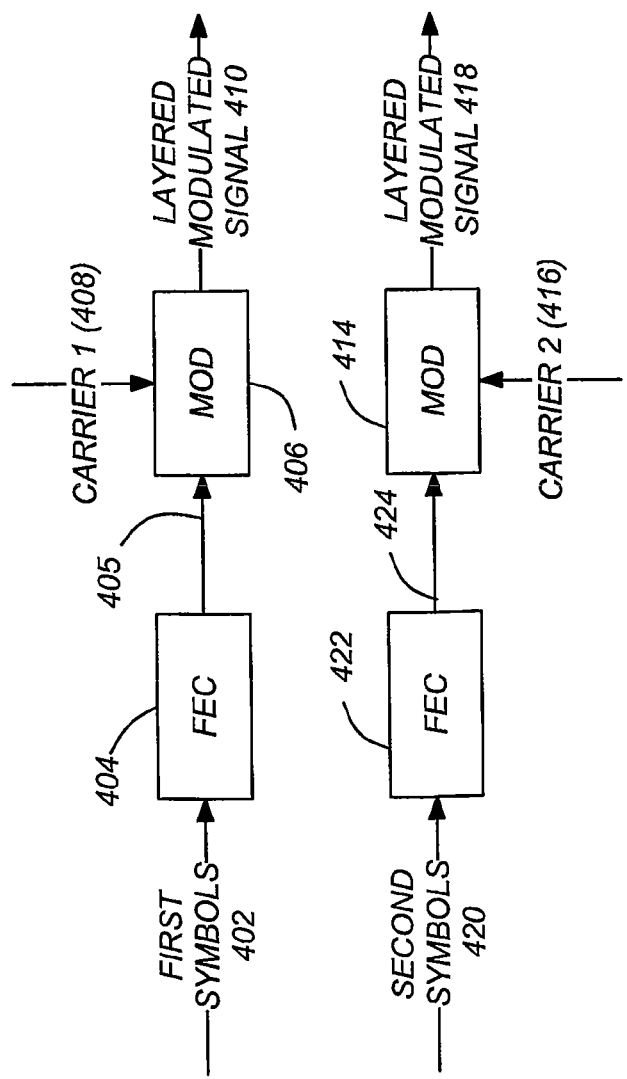
FIG. 4 is a block diagram showing one embodiment of the modulator for the feeder link signal.

FIG. 4 is a block diagram showing one embodiment of the modulator 220. The modulator 220 optionally comprises a forward error correction (FEC) encoder 404 which accepts the first signal symbols 402 and adds redundant information that are used to reduce transmission errors. The coded symbols 405 are modulated by modulator 406 according to a first carrier 408 to produce an upper layer modulated signal 410. Second symbols 420 are likewise provided to an optional second FEC encoder 422 to produce coded second symbols 422. The coded second symbols 422 are provided to a second modulator 414, which modulates the coded second signals according to a second carrier 416 to produce a lower layer modulated signal 418. The resulting signals are then transmitted by one or more transmitters 420, 422. The upper layer modulated signal 410 and the lower layer modulated signal 418 are therefore uncorrelated, and the frequency range used to transmit each layer can substantially or completely overlap the frequency spectrum used to transmit the other. For example, as shown in FIG. 4, the frequency spectrum $f_1 \rightarrow f_3$ 432 of the upper layer signal 410 may overlap the frequency spectrum $f_2 \rightarrow f_4$ 434 of the lower layer signal 418 in frequency band $f_2$-$f_3$ 436. The upper layer signal 410, however, must be a sufficiently greater amplitude signal than the lower layer signal 418, in order to maintain the signal constellations shown in FIG. 6 and FIG. 7. The modulator 220 may also employ pulse shaping techniques (illustrated by pulse p(t) 430) to account for the limited channel bandwidth. Although FIG. 4 illustrates the same pulse shaping p(t) 430 being applied to both layers, different pulse shaping can be applied to each layer as well.

It should be noted that it may be more efficient to retrofit an existing system by using a transponder on a separate satellite 108 to transmit the lower layer downlink signal over the existing legacy downlink signal rather than replacing the legacy satellite with one that will transmit both downlink signal layers. Emphasis can be given to accommodating the downlink legacy signal in implementing a layered downlink broadcast.

2.3 Integrated Receiver/Decoder

Figure 5:
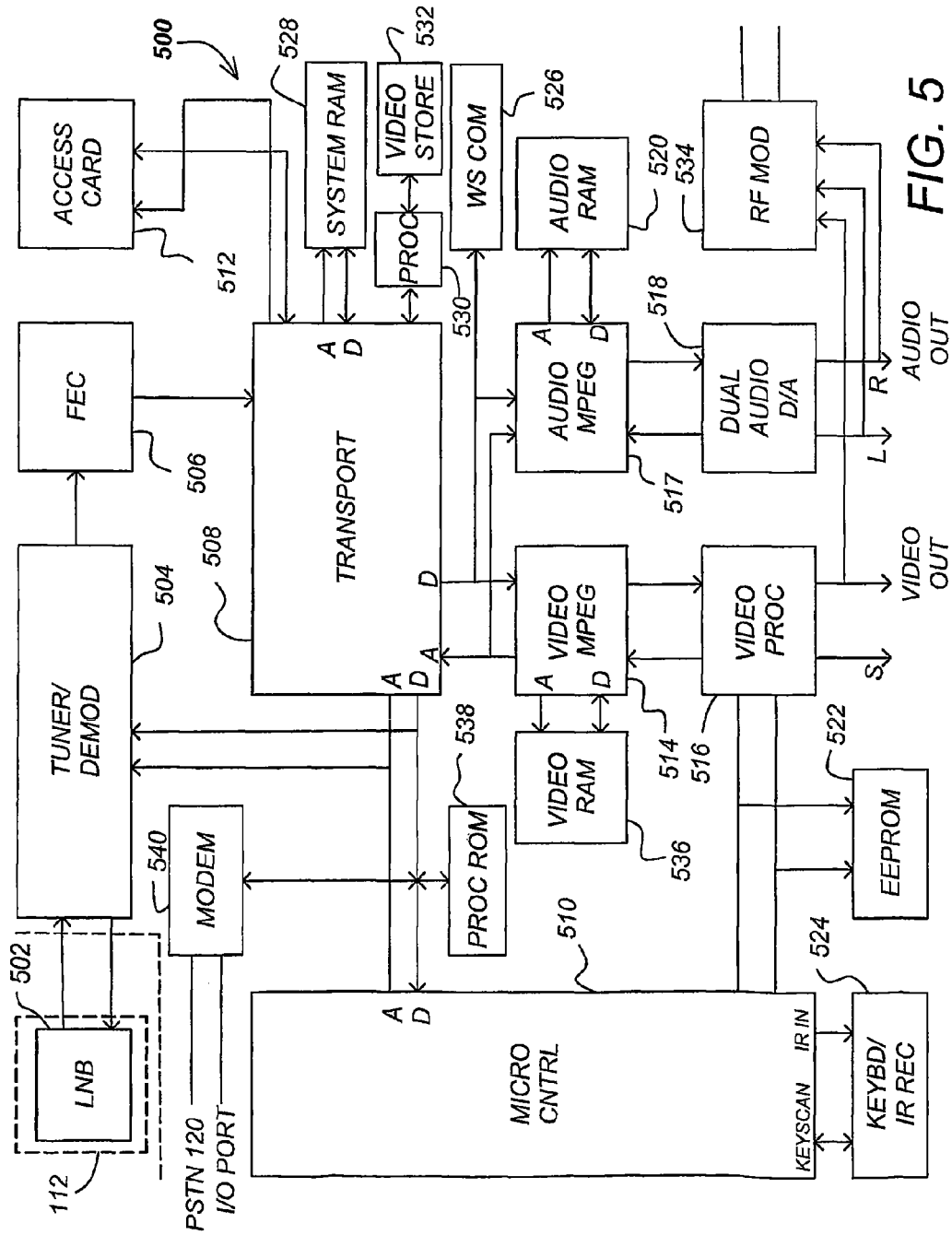
FIG. 5 is a block diagram of an integrated receiver/decoder (IRD)

FIG. 5 is a block diagram of an integrated receiver/decoder (IRD) 500 (also hereinafter alternatively referred to as receiver 500). The receiver 500 comprises a tuner/demodulator 504 communicatively coupled to an ODU 112 having one or more low noise blocks (LNBs) 502. The LNB 502 converts the 12.2- to 12.7 GHz downlink 118 signal from the satellites 108 to, e.g., a 950-1450 MHz signal required by the IRD's 500 tuner/demodulator 504. Typically, the LNB 502 may provide either a dual or a single output. The single-output LNB 502 has only one RF connector, while the dual output LNB 502 has two RF output connectors and can be used to feed a second tuner 504, a second receiver 500, or some other form of distribution system.

The tuner/demodulator 504 isolates a single, digitally modulated 24 MHz transponder signal, and converts the modulated data to a digital data stream. The digital data stream is then supplied to a forward error correction (FEC) decoder 506. This allows the IRD 500 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 500. The transport module 508 processes data received from the FEC decoder module 506 and provides the processed data to the video MPEG decoder 514 and the audio MPEG decoder 517. As needed the transport module employs system RAM 528 to process the data. In one embodiment of the present invention, the transport module 508, video MPEG decoder 514 and audio MPEG decoder 517 are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the receiver 500 is permitted to access certain program material. Data from the transport module 508 can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a removable smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 517. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 510 receives and processes command signals from a remote control, an IRD 500 keyboard interface, and/or other suitable input device 524. The microcontroller 510 receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. Video storage device 532 can be a hard disk drive, a read/writable compact disc of DVD, a solid state RAM, or any other suitable storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigal side band (VSB) suitable as an input signal to a conventional television tuner. This allows the receiver 500 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

The present invention provides for the modulation of signals at different power levels and advantageously for the signals to be non-coherent from each layer. In addition, independent modulation and coding of the signals may be performed. Backwards compatibility with legacy receivers, such as a quadrature phase shift keying (QPSK) receiver is enabled and new services are provided to new receivers. A typical new receiver of the present invention uses two demodulators and one remodulator (which can be combined in one or more processors) as will be described in detail hereafter.

In a typical backwards-compatible embodiment of the present invention, the legacy QPSK signal is boosted in power to a higher transmission (and reception) level. The legacy receiver will not be able to distinguish the new lower layer signal, from additive white Gaussian noise, and thus operates in the usual manner. The optimum selection of the layer power levels is based on accommodating the legacy equipment, as well as the desired new throughput and services.

The new lower layer signal is provided with a sufficient carrier to thermal noise ratio to function properly. The new lower layer signal and the boosted legacy signal are non-coherent with respect to each other. Therefore, the new lower layer signal can be implemented from a different TWTA and even from a different satellite. The new lower layer signal format is also independent of the legacy format, e.g., it may be QPSK or 8PSK, using the conventional concatenated FEC code or using a new Turbo code. The lower layer signal may even be an analog signal.

The combined layered signal is demodulated and decoded by first demodulating the upper layer to remove the upper carrier. The stabilized layered signal may then have the upper layer FEC decoded and the output upper layer symbols communicated to the upper layer transport. The upper layer symbols are also employed in a remodulator, to generate an idealized upper layer signal. The idealized upper layer signal is then subtracted from the stable layered signal to reveal the lower layer signal. The lower layer signal is then demodulated and FEC decoded and communicated to the lower layer transport.

Signals, systems and methods using the present invention may be used to supplement a pre-existing transmission compatible with legacy receiving hardware in a backwards-compatible application or as part of a preplanned layered modulation architecture providing one or more additional layers at a present or at a later date.

2.4 Layered Signals

Figure 6B:
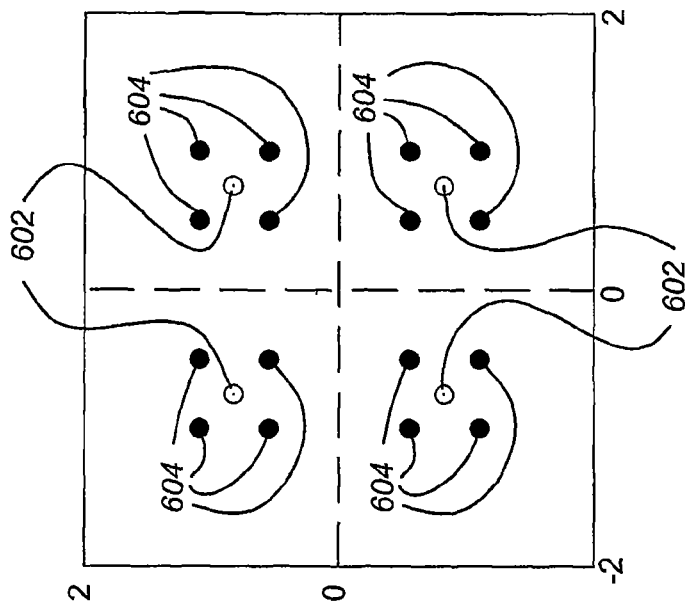
FIGS. 6A-6C are diagrams illustrating the basic relationship of signal layers in a layered modulation transmission.
Figure 6A:
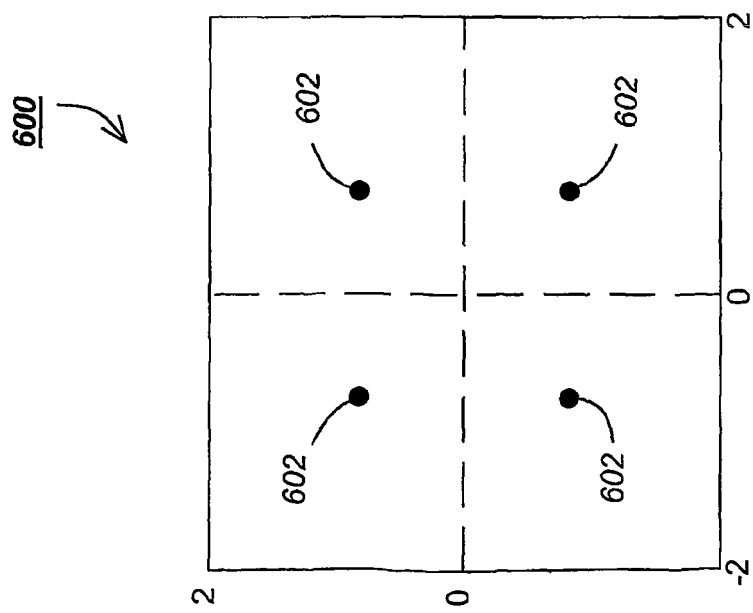
Figure 6C:
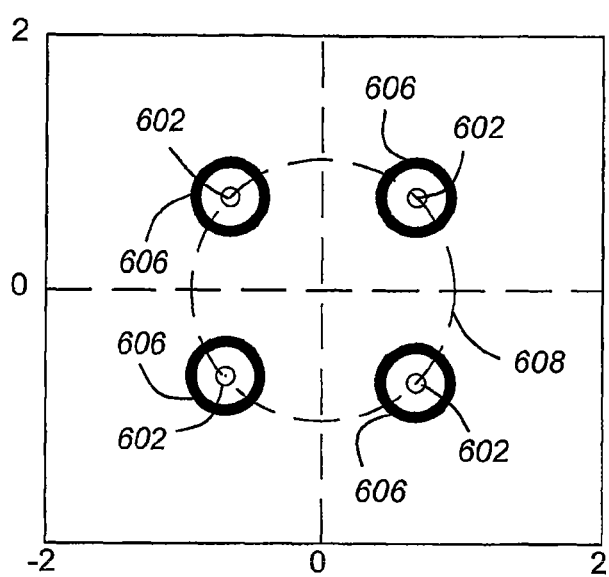

FIGS. 6A-6C illustrate the basic relationship of signal layers in a received layered modulation transmission. FIG. 6A illustrates an upper layer signal constellation 600 of a transmission signal showing the signal points or symbols 602. FIG. 6B illustrates the lower layer signal constellation of symbols 604 over the upper layer signal constellation 600 where the layers are coherent (or synchronized). FIG. 6C illustrates a lower layer signal 606 of a second transmission layer over the upper layer constellation where the layers are non-coherent. The lower layer 606 rotates about the upper layer constellation 602 due to the relative modulating frequencies of the two layers in a non-coherent transmission. Both the upper and lower layers rotate about the origin due to the first layer modulation frequency as described by path 608.

Figure 7B:
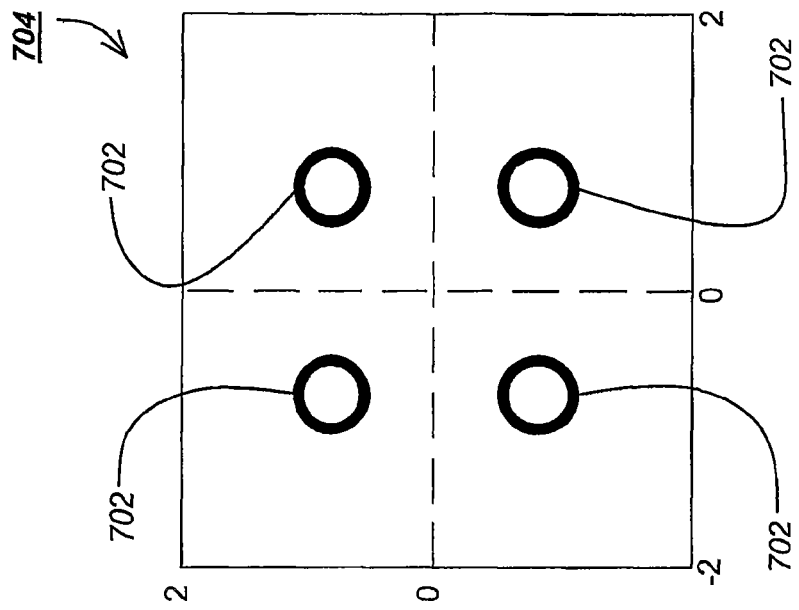
Figure 7A:
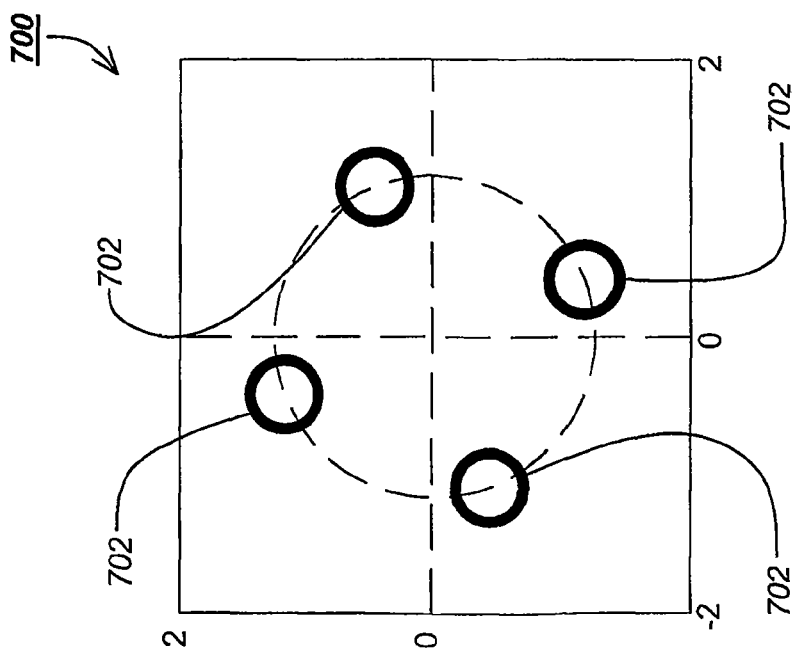

FIGS. 7A-7C are diagrams illustrating a non-coherent relationship between a lower transmission layer over the upper transmission layer after upper layer demodulation. FIG. 7A shows the constellation 700 before the first carrier recovery loop (CRL) of the upper layer. The constellation rings 702 rotate around the large radius circle indicated by the dashed line. FIG. 7B shows the constellation 704 after CRL of the upper layer where the rotation of the constellation rings 702 is stopped. The constellation rings 702 are the signal points of the lower layer around the nodes 602 of the upper layer. FIG. 7C depicts a phase distribution of the received signal with respect to nodes 602.

Relative modulating frequencies of the non-coherent upper and lower layer signals cause the lower layer constellation to rotate around the nodes 602 of the upper layer constellation to form rings 702. After the lower layer CRL this rotation is eliminated and the nodes of the lower layer are revealed (as shown in FIG. 6B). The radius of the lower layer constellation rings 702 is indicative of the lower layer power level. The thickness of the rings 702 is indicative of the carrier to noise ratio (CNR) of the lower layer. As the two layers are non-coherent, the lower layer may be used to transmit distinct digital or analog signals.

Figure 8A:
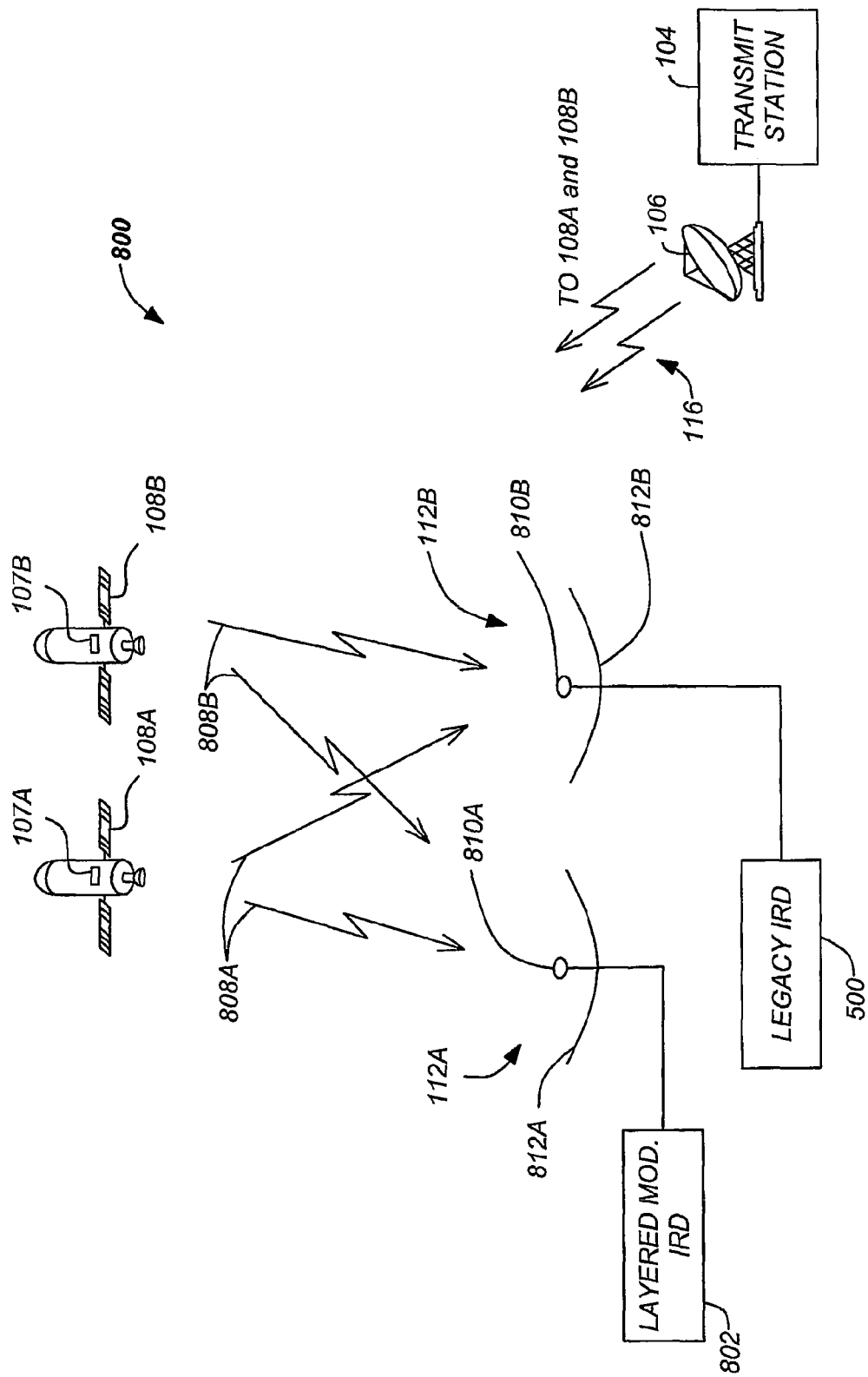
FIG. 8A is a diagram showing a system for transmitting and receiving layered modulation signals.

FIG. 8A is a diagram showing a system for transmitting and receiving layered modulation signals. Separate transponders 107A, 107B (which include TWTAs to amplify the signals), as may be located on any suitable platform, such as satellites 108A, 108B, are used to non-coherently transmit different layers of a signal of the present invention. One or more feeder link signals 116 are typically transmitted to each satellite 108A, 108B from one or more uplink centers 104 with one or more transmitters 105 via an antenna 106. The present invention describes particular feeder link architectures for use in a layered modulation system.

Figure 8B:
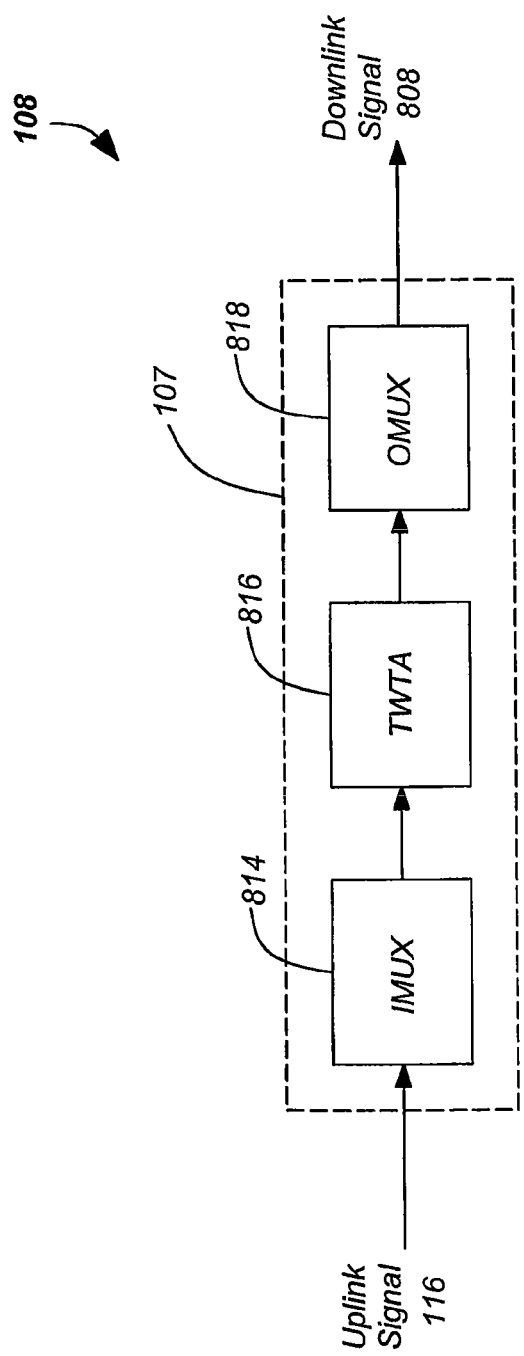
FIG. 8B is a diagram showing an exemplary satellite transponder for receiving and transmitting layered modulation signals.

FIG. 8B is a diagram illustrating an exemplary satellite transponder 107 for receiving and transmitting layered modulation signals on a satellite 108. The feeder link signal 116 is received by the satellite 108 and passed through an input multiplexer (IMUX) 814. Following this the signal is amplified with one or more a traveling wave tube amplifiers (TWTAs) 816 and then through an output multiplexer (OMUX) 818 before the downlink signal 118 is transmitted to the receivers 802, 500. As is known in the art, the TWTA 816 block can be multiple TWTAs in a power combiner, particularly in the case of the upper layer signal. Embodiments of the present invention relate to specific architectures of the feeder link and satellite transponders 107 as detailed hereafter in section 5.

The layered signals 808A, 808B (e.g. multiple downlink signals 118) are received at receiver antennas 812A, 812B, such as satellite dishes, each with a low noise block (LNB) 810A, 810B where they are then coupled to integrated receiver/decoders (IRDs) 500, 802. For example, first satellite 108A and transponder 107A can transmit an upper layer legacy signal 808A and second satellite 108B and transponder 107B can transmit a lower layer signal 808B. Although both signals 808A, 808B arrive at each antenna 812A, 812B and LNB 810A, 810B, only the layer modulation IRD 802 is capable of decoding both signals 808A, 808B. The legacy receiver 500 is only capable of decoding the upper layer legacy signal 808A; the lower layer signal 808B appears only as noise to the legacy receiver 500.

Because the signal layers can be transmitted non-coherently, separate transmission layers may be added at any time using different satellites 108A, 108B or other suitable platforms, such as ground-based or high altitude platforms. Thus, any composite signal, including new additional signal layers will be backwards compatible with legacy receivers 500, which will disregard the new signal layers. To ensure that the signals do not interfere, the combined signal and noise level for the lower layer must be at or below the allowed noise floor for the upper layer at the particular receiver antenna 812A, 812B.

Layered modulation applications include backwards compatible and non-backwards compatible applications. "Backwards compatible" in this sense, describes systems in which legacy receivers 500 are not rendered obsolete by the additional signal layer(s). Instead, even if the legacy receivers 500 are incapable of decoding the additional signal layer(s), they are capable of receiving the layered modulated signal and decoding the original signal layer. In these applications, the pre-existing system architecture is accommodated by the architecture of the additional signal layers. "Non-backwards compatible" describes a system architecture which makes use of layered modulation, but the modulation scheme employed is such that pre-existing equipment is incapable of receiving and decoding the information on additional signal layer(s).

The pre-existing legacy IRDs 500 decode and make use of data only from the layer (or layers) they were designed to receive, unaffected by the additional layers. However, as will be described hereafter, the legacy signals may be modified to optimally implement the new layers. The present invention may be applied to existing direct satellite services which are broadcast to individual users in order to enable additional features and services with new receivers without adversely affecting legacy receivers and without requiring additional signal frequency.

2.5 Demodulator and Decoder

Figure 9:
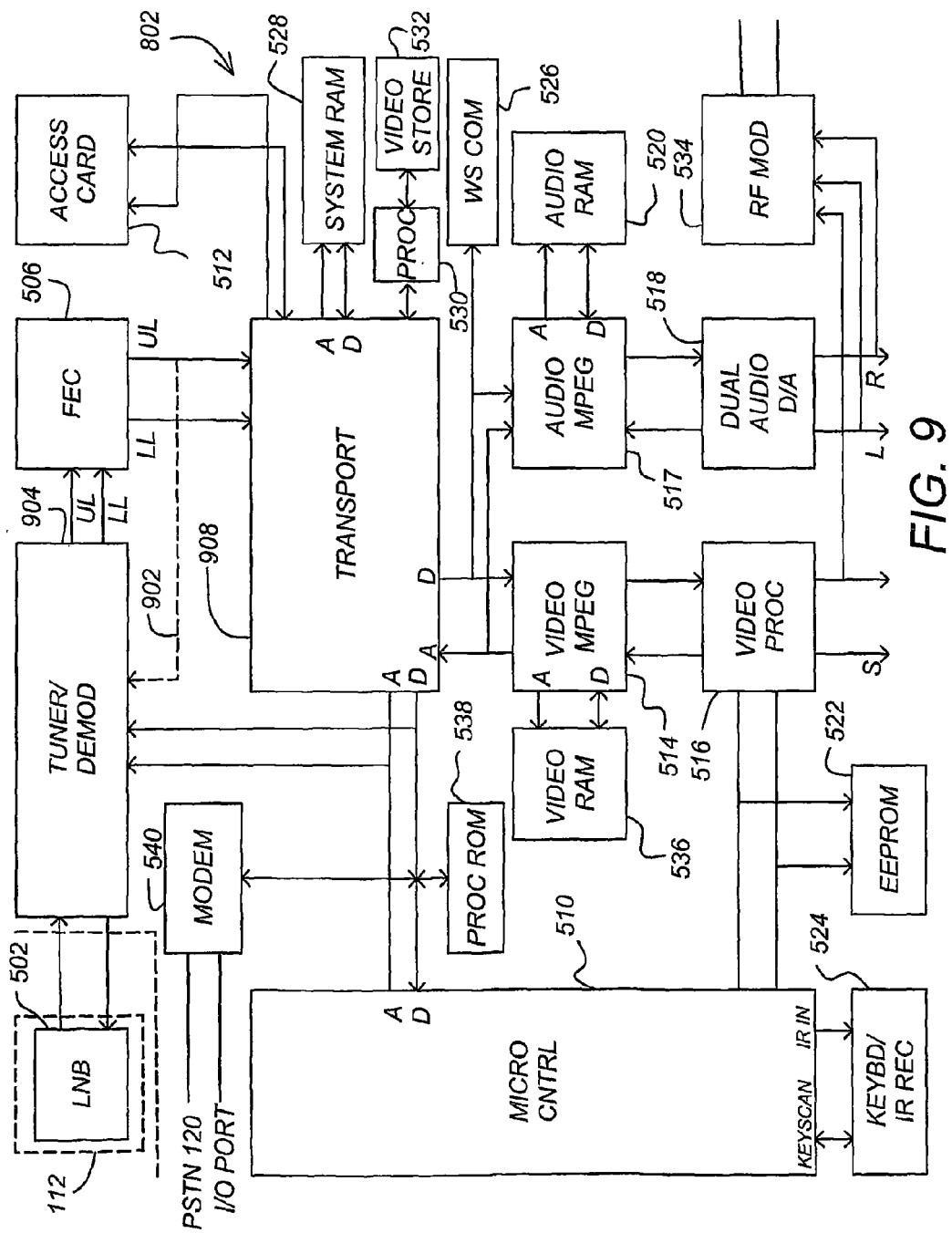
FIG. 9 is a block diagram depicting one embodiment of an enhanced IRD capable of receiving layered modulation signals.

FIG. 9 is a block diagram depicting one embodiment of an enhanced IRD 802 capable of receiving layered modulation signals. The IRD includes many similar components as that of the legacy IRD 500 of FIG. 5. However, the enhanced IRD 802 includes a feedback path 902 in which the FEC decoded symbols are fed back to an enhanced modified tuner/demodulator 904 and transport module 908 for decoding both signal layers as detailed hereafter.

Figure 10A:
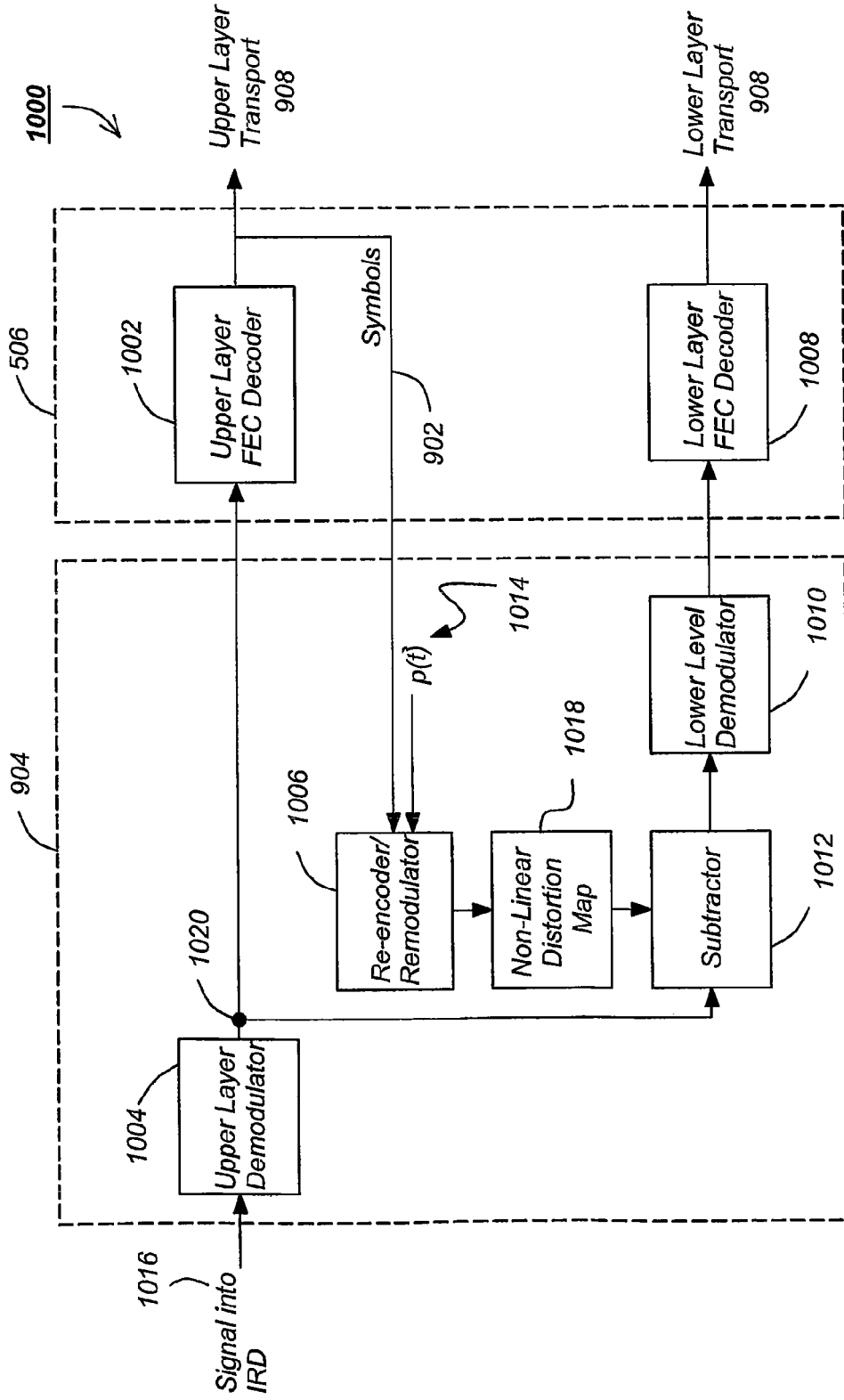
FIG. 10A is a block diagram of one embodiment of the enhanced tuner/modulator and FEC encoder.

FIG. 10A is a block diagram of one embodiment of the enhanced tuner/modulator 904 and FEC encoder 506. FIG. 10A depicts reception where layer subtraction is performed on a signal where the upper layer carrier has already been demodulated. The upper layer of the received combined signal 1016 from the LNB 502, which may contain legacy modulation format, is provided to and processed by an upper layer demodulator 1004 to produce the stable demodulated signal 1020. The demodulated signal 1020 is communicatively coupled to a FEC decoder 1002 which decodes the upper layer to produce the upper layer symbols which are output to an upper layer transport module 908. The upper layer symbols are also used to generate an idealized upper layer signal. The upper layer symbols may be produced from the decoder 1002 after Viterbi decode (BER<$10^{-3}$ or so) or after Reed-Solomon (RS) decode (BER<$10^{-9}$ or so), in typical decoding operations known to those skilled in the art. The upper layer symbols are provided via feedback path 902 from the upper layer decoder 1002 to a re-encoder/remodulator 1006 which effectively produces an idealized upper layer signal. The idealized upper level signal is subtracted from the demodulated upper layer signal 1020.

In order for the subtraction to yield a suitable lower layer signal, the upper layer signal must be precisely reproduced. The modulated signal may have been distorted, for example, by traveling wave tube amplifier (TWTA) non-linearity or other non-linear or linear distortions in the transmission channel. The distortion effects are estimated from the received signal after the fact or from TWTA characteristics which may be downloaded into the IRD in AM-AM and/or AM-PM maps 1014, used to eliminate the distortion using non-linear distortion map module 1018.

A subtractor 1012 then subtracts the idealized upper layer signal from the stable demodulated signal 1020. This leaves the lower-power second layer signal. The subtractor 1012 may include a buffer or delay function to retain the stable demodulated signal 1020 while the idealized upper layer signal is being constructed. The second layer signal is demodulated by the lower level demodulator 1010 and FEC decoded by decoder 1008 according to its signal format to produce the lower layer symbols, which are provided to the transport module 908.

Figure 10B:
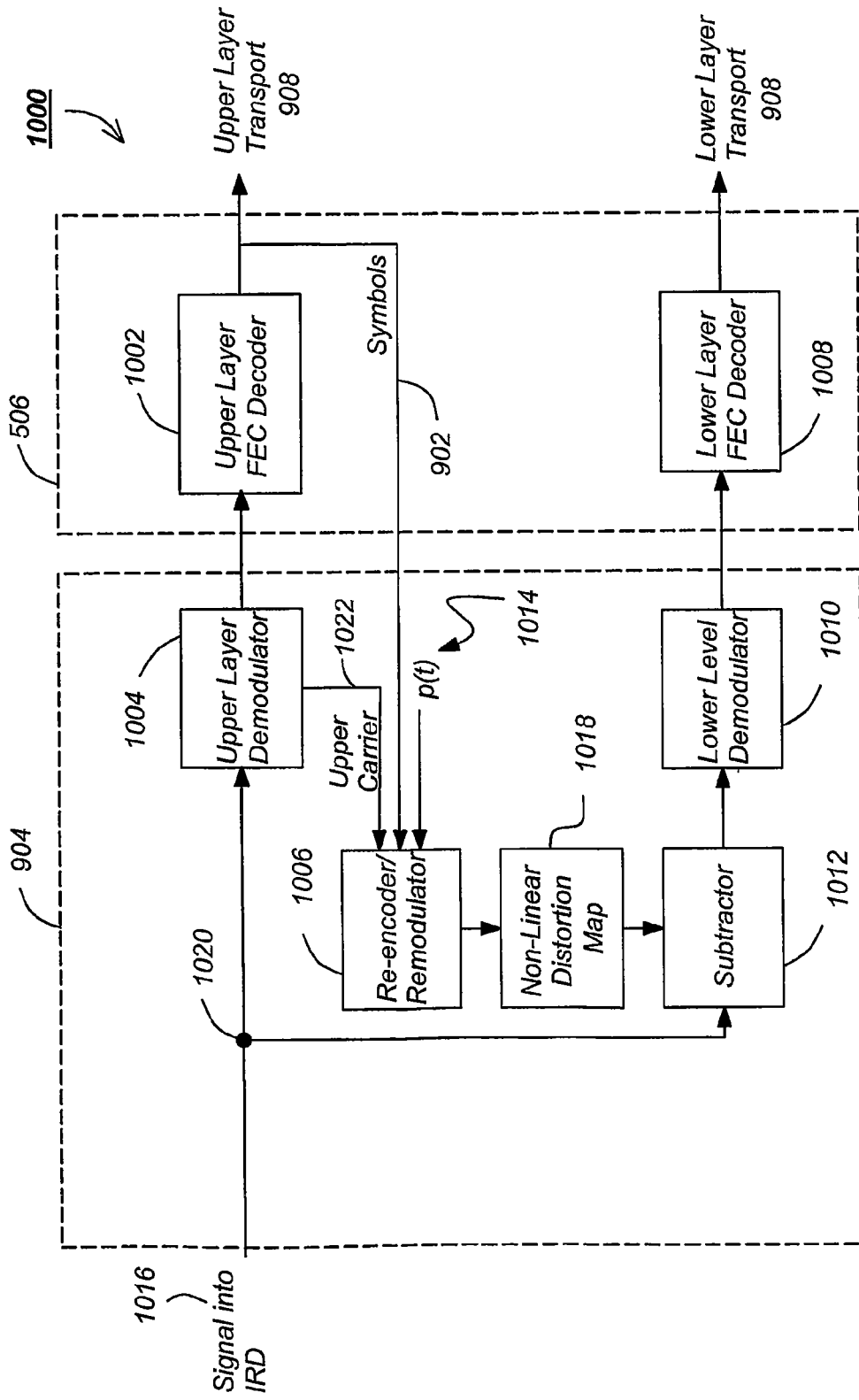
FIG. 10B depicts another embodiment of the enhanced tuner/modulator wherein layer subtraction is performed on the received layered signal.

FIG. 10B depicts another embodiment wherein layer subtraction is performed on the received layered signal (prior to upper layer demodulation). In this case, the upper layer demodulator 1004 produces the upper carrier signal 1022 (as well as the stable demodulated signal output 1020). An upper carrier signal 1022 is provided to the re-encoder/remodulator 1006. The re-encoder/remodulator 1006 provides the re-encoded and remodulated signal to the non-linear distortion mapper 1018 which effectively produces an idealized upper layer signal. Unlike the embodiment shown in FIG. 10A, in this embodiment the idealized upper layer signal includes the upper layer carrier for subtraction from the received combined signal 808A, 808B.

Other equivalent methods of layer subtraction will occur to those skilled in the art and the present invention should not be limited to the examples provided here. Furthermore, those skilled in the art will understand that the present invention is not limited to two layers; additional layers may be included. Idealized upper layers are produced through remodulation from their respective layer symbols and subtracted. Subtraction may be performed on either the received combined signal or a demodulated signal. Finally, it is not necessary for all signal layers to be digital transmissions; the lowest layer may be an analog transmission.

The following analysis describes the exemplary two layer demodulation and decoding. It will be apparent to those skilled in the art that additional layers may be demodulated and decoded in a similar manner. The incoming combined signal is represented as:

$$s_{UL}(t) = f_U\left(M_U \exp(j\omega_U t + \theta_U) \sum_{m=-\infty}^{\infty} S_{Um} p(t - mT)\right) + f_L\left(M_L \exp(j\omega_L t + \theta_L) \sum_{m=-\infty}^{\infty} S_{Lm} p(t - mT + \Delta T_m)\right) + n(t)$$

where, $M_U$ is the magnitude of the upper layer QPSK signal and $M_L$ is the magnitude of the lower layer QPSK signal and $M_L \ll M_U$. The signal frequencies and phase for the upper and lower layer signals are respectively $\omega_U$, $\theta_U$ and $\omega_U$, $\theta_U$. The symbol timing misalignment between the upper and lower layers is $\Delta T_m$. p(t−mT) represents the time shifted version of the pulse shaping filter p(t) 414 employed in signal modulation. QPSK symbols $S_{Um}$ and $S_{Lm}$ are elements of $$\left\{\exp\left(j\frac{n\pi}{2}\right), n = 0, 1, 2, 3\right\}.$$

$f_U(\cdot)$ and $f_L(\cdot)$ denote the distortion function of the TWTAs for the respective signals.

Ignoring $f_U(\cdot)$ and $f_L(\cdot)$ and noise n(t), the following represents the output of the demodulator 1004 to the FEC decoder 1002 after removing the upper carrier:

$$s'_{UL}(t) = M_U \sum_{m=-\infty}^{\infty} S_{Um} p(t - mT) + M_L \exp\{j(\omega_L - \omega_U)t + \theta_L - \theta_U\} \sum_{m=-\infty}^{\infty} S_{Lm} p(t - mT + \Delta T_m)$$

Because of the magnitude difference between $M_U$ and $M_L$, the upper layer decoder 402 disregards the $M_L$ component of the $s'_{UL}(t)$.

After subtracting the upper layer from $s_{UL}(t)$ in the subtractor 1012, the following remains:

$$s_L(t) = M_L \exp\{j(\omega_L - \omega_U)t + \theta_L - \theta_U\} \sum_{m=-\infty}^{\infty} S_{Lm} p(t - mT + \Delta T_m)$$

Any distortion effects, such as TWTA nonlinearity effects are estimated for signal subtraction. In a typical embodiment of the present invention, the upper and lower layer frequencies are substantially equal. Significant improvements in system efficiency can be obtained by using a frequency offset between layers.

Using the present invention, two-layered backward compatible modulation with QPSK doubles a current 6/7 rate capacity by adding a TWTA approximately 6.2 dB above an existing TWTA power. New QPSK signals may be transmitted from a separate transmitter, from a different satellite for example. In addition, there is no need for linear travelling wave tube amplifiers (TWTAs) as with 16QAM. Also, no phase error penalty is imposed on higher order modulations such as 8PSK and 16QAM.

3.0 Power Levels of Modulation Layers

In a layered modulation system, the relationship between the individual modulation layers can be structured to facilitate backward compatible applications. Alternately, a new layer structure can be designed to optimize the combined efficiency and/or performance of the layered modulation system.

3.1 Backward Compatible Applications

Figure 11A:
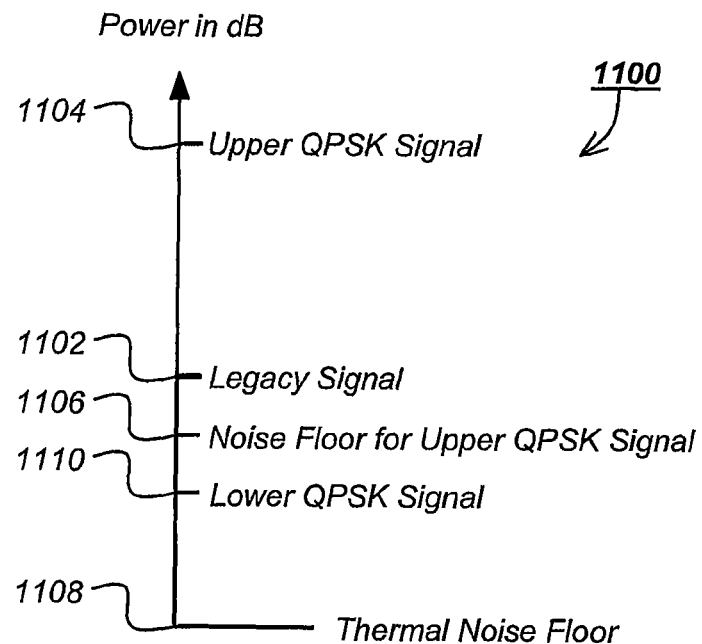
FIGS. 11A and 11B depict the relative power levels of example embodiments of the present invention.

FIG. 11A depicts the relative power levels 1100 of example embodiments of the present invention without taking into account the effects of rain. Accommodation of rain fade effects comes through the inclusion of clear sky margin in the calculation of transmit power levels, and this is treated in a later section. FIG. 11A is not a scale drawing. This embodiment doubles the pre-existing rate 6/7 capacity by using a TWTA whose power level is 6.2 dB above a pre-existing (legacy) TWTA, and a second TWTA whose power level is 2 dB below that of a pre-existing (legacy) TWTA. This embodiment uses upper and lower QPSK layers which are non-coherent. An FEC code rate of 6/7 is also used for both layers. In this embodiment, the signal of the legacy QPSK signal 1102 is used to generate the upper layer 1104 and a new QPSK layer is the lower layer 1110. The legacy QPSK signal 1102 has a threshold CNR (i.e., the carrier to noise ratio required to achieve acceptable performance) of approximately 7 dB. The new lower QPSK layer 1110 has a threshold CNR of approximately 5 dB. In the present invention, then, the lower QPSK layer transmit power level 1110 is first set so that the received lower layer power is 5 dB above the reference thermal noise power level 1108. Both the thermal noise and the lower layer signal will appear as noise to the upper layer legacy QPSK signal, and this combined noise power must be taken into account when setting the upper layer transmit power level. The combined power of these two noise sources 1106 is 6.2 dB above the reference thermal noise floor 1108. The legacy QPSK signal must then be boosted in power by approximately 6.2 dB above the legacy signal power level 1102 bringing the new power level to approximately 13.2 dB as the upper layer 1104. In this way the combined lower layer signal power and thermal noise power is kept at or below the tolerable noise floor 1106 of the upper layer. It should be noted that the invention may be extended to multiple layers with mixed modulations, coding and code rates.

In an alternate embodiment of this backwards compatible application, an FEC code rate of 2/3 may be used for both the upper and lower layers 1104, 1110. In this case, the threshold CNR of the legacy QPSK signal 1102 (with an FEC code rate of 2/3) is approximately 5.8 dB. The legacy signal 1102 is boosted by approximately 5.3 dB to approximately 11.1 dB (4.1 dB above the legacy QPSK signal 1102 with an FEC code rate of 2/3) to form the upper QPSK layer 1104. The new lower QPSK layer 1110 has a threshold CNR of approximately 3.8 dB. The total signal and noise of the lower layer 1110 is kept at or below approximately 5.3 dB, the tolerable noise floor 1106 of the upper QPSK layer. In this case, the total capacity is 1.55 times that the legacy signal 1102.

In a further embodiment of a backwards compatible application of the present invention the code rates between the upper and lower layers 1104, 1110 may be mixed. For example, the legacy QPSK signal 502 may be boosted by approximately 5.3 dB to approximately 12.3 dB with the FEC code rate unchanged at 6/7 to create the upper QPSK layer 1104. The new lower QPSK layer 1110 may use an FEC code rate of 2/3 with a threshold CNR of approximately 3.8 dB. In this case, the total capacity is 1.78 times that of the legacy signal 1102.

3.2 Non-Backward Compatible Applications

As previously discussed the present invention may also be used in "non-backward compatible" applications. In a first example embodiment, two QPSK layers 1104, 1110 are used each at a code rate of 2/3. The upper QPSK layer 504 has a CNR of approximately 4.1 dB above its noise floor 1106 and the lower QPSK layer 1110 also has a CNR of approximately 4.1 dB. The total code and noise level of the lower QPSK layer 1110 is approximately 5.5 dB. The total CNR for the upper QPSK signal 1104 is approximately 9.4 dB, merely 2.4 dB above the legacy QPSK signal rate 6/7. The capacity is approximately 1.74 compared to the legacy rate 6/7.

Figure 11B:
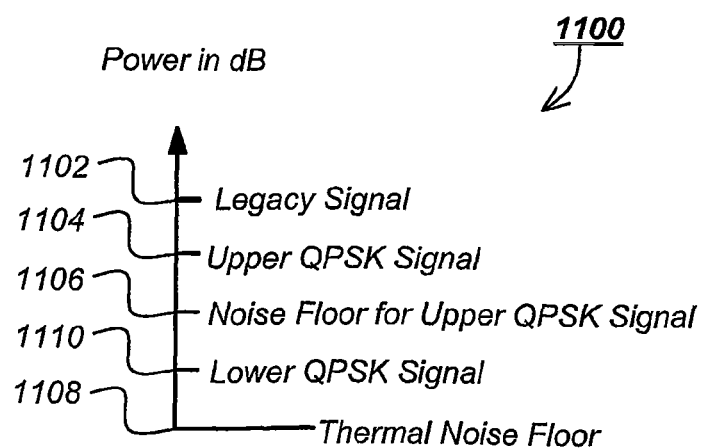

FIG. 11B depicts the relative power levels of an alternate embodiment wherein both the upper and lower layers 1104, 1110 are below the legacy signal level 1102. The two QPSK layers 1104, 1110 use a code rate of 1/2. In this example, the upper QPSK layer 1104 is approximately 2.0 dB above its noise floor 1106 of approximately 4.1 dB. The lower QPSK layer has a CNR of approximately 2.0 dB and a total code and noise level at or below 4.1 dB. The capacity of this embodiment is approximately 1.31 compared to the legacy rate 6/7.

4. Hardware Environment

Figure 12:
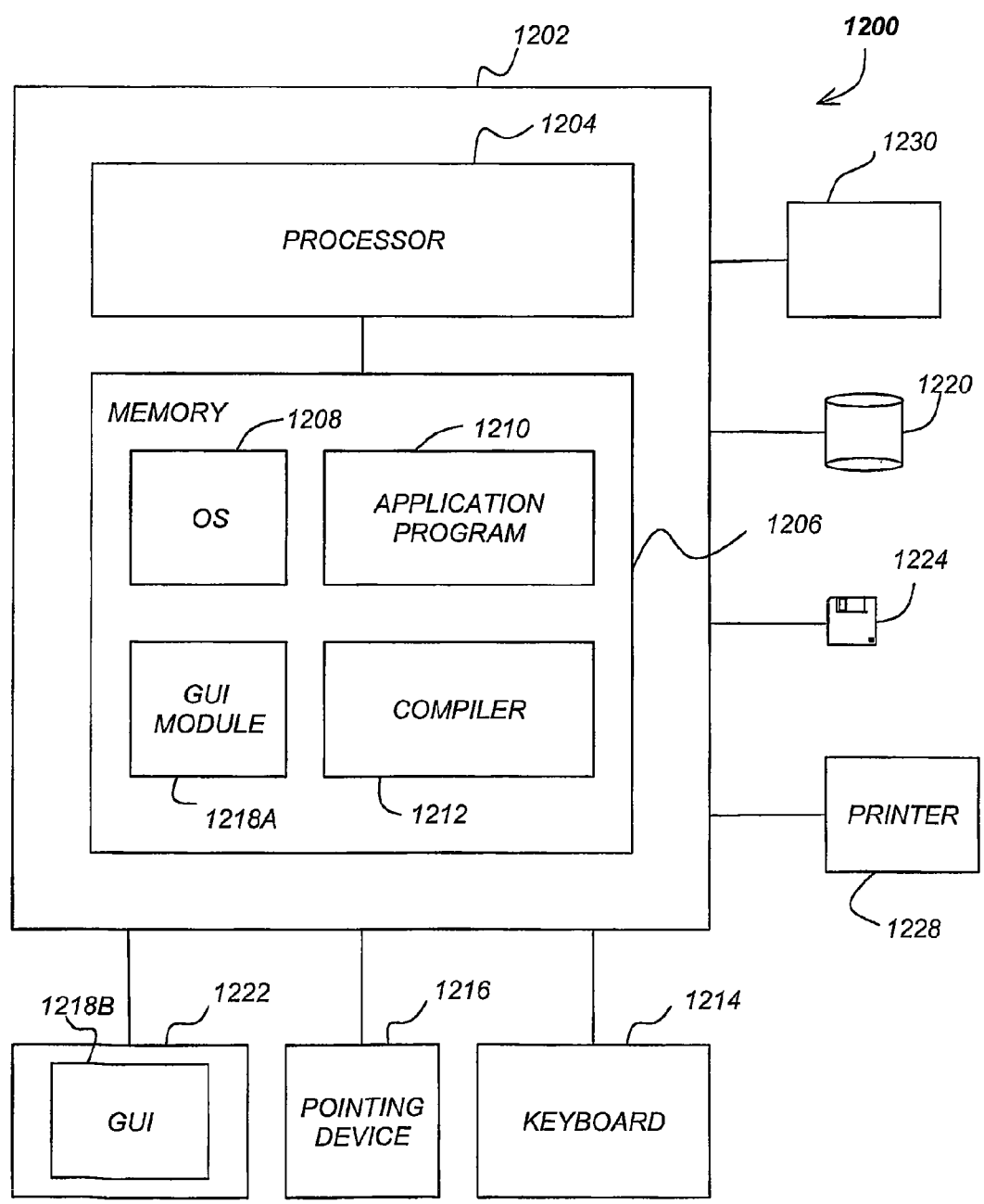
FIG. 12 illustrates an exemplary computer system that could be used to implement selected modules or functions the present invention.

FIG. 12 illustrates an exemplary computer system 1200 that could be used to implement selected modules and/or functions of the present invention. The computer 1202 comprises a processor 1204 and a memory 1206, such as random access memory (RAM). The computer 1202 is operatively coupled to a display 1222, which presents images such as windows to the user on a graphical user interface 1218B. The computer 1202 may be coupled to other devices, such as a keyboard 1214, a mouse device 1216, a printer, etc. Of course, those skilled in the art will recognize that any combination of the above components, or any number of different components, peripherals, and other devices, may be used with the computer 1202.

Generally, the computer 1202 operates under control of an operating system 1208 stored in the memory 1206, and interfaces with the user to accept inputs and commands and to present results through a graphical user interface (GUI) module 1218A. Although the GUI module 1218A is depicted as a separate module, the instructions performing the GUI functions can be resident or distributed in the operating system 1208, the computer program 1210, or implemented with special purpose memory and processors. The computer 1202 also implements a compiler 1212 which allows an application program 1210 written in a programming language such as COBOL, C++, FORTRAN, or other language to be translated into processor 1204 readable code. After completion, the application 1210 accesses and manipulates data stored in the memory 1206 of the computer 1202 using the relationships and logic that was generated using the compiler 1212. The computer 1202 also optionally comprises an external communication device such as a modem, satellite link, Ethernet card, or other device for communicating with other computers.

In one embodiment, instructions implementing the operating system 1208, the computer program 1210, and the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, etc. Further, the operating system 1208 and the computer program 1210 are comprised of instructions which, when read and executed by the computer 1202, causes the computer 1202 to perform the steps necessary to implement and/or use the present invention. Computer program 1210 and/or operating instructions may also be tangibly embodied in memory 1206 and/or data communications devices 1230, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

5. Feeder Link Architectures

Four configurations of feeder link architecture that require only as much feeder link spectrum as downlink layered modulation spectrum are discussed below. These embodiments of the present invention comprise feeder link architectures represented by the examples shown in FIGS. 13A, 14A, 15A and 16A hereafter. As detailed below, these embodiments may include alterations and/or elaboration to the basic modulator 220 and transponder 108 of the exemplary system of FIGS. 4 and 8B previously described. For example, the feeder link architectures of the present invention, are not limited to applications where the upper layer signal is a legacy signal.

In each of the configurations of FIGS. 13A, 14A, 15A and 16A, if the upper layer and lower layer signals 808A, 808B are appropriately designed, the upper layer signal 808A can be a legacy signal. Accordingly, a legacy IRD 500 can demodulate the upper layer signal 808A directly from the layered signal. The lower layer signal 808B is ignored as noise in the legacy IRD 500. Alternately, in a layered modulation IRD 802, both the upper layer and lower layer signals 808A, 808B are demodulated.

5.1 Feeder Link Spot Beams

Figure 13A:
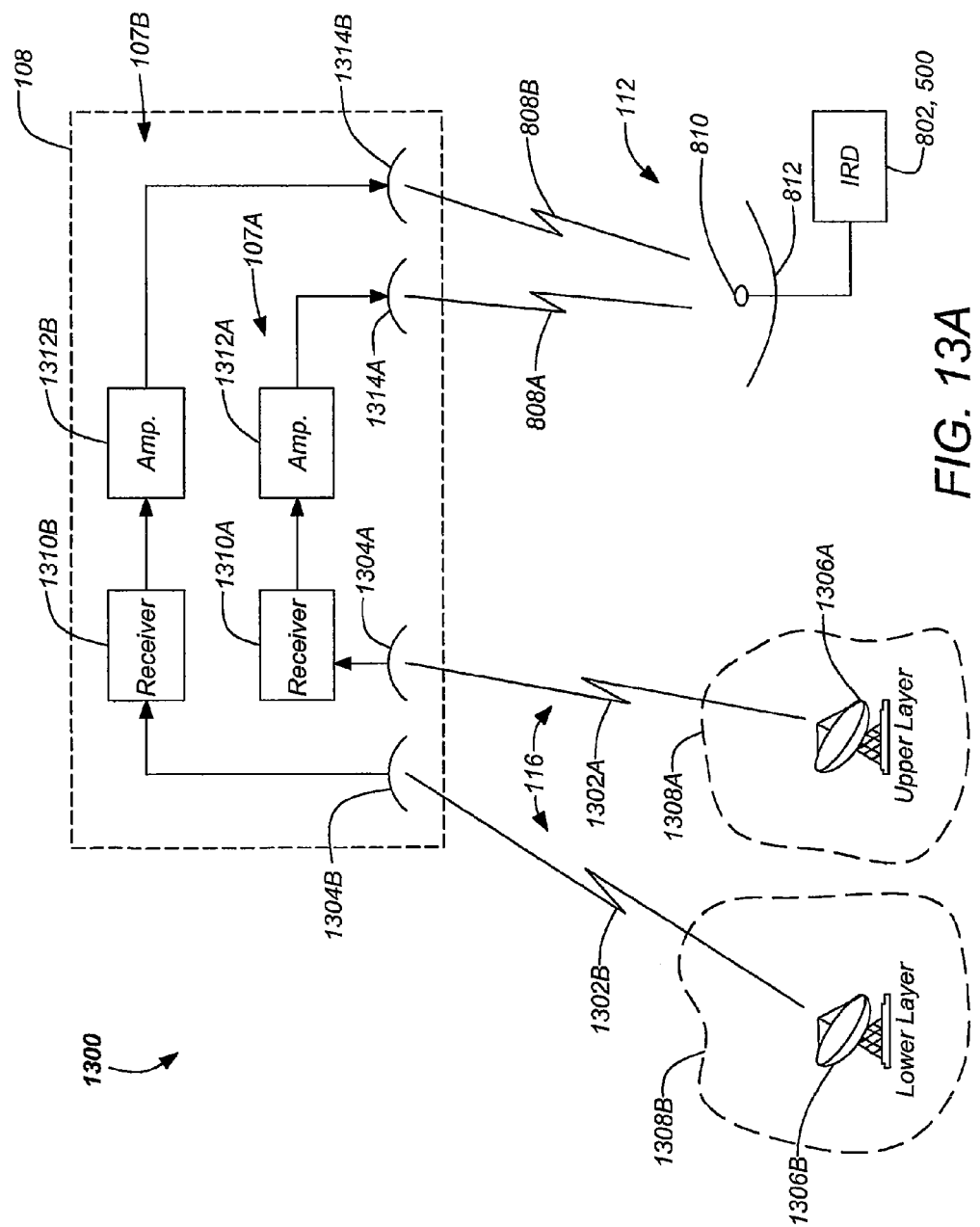
FIG. 13A illustrates a first feeder link architecture for a layered modulation signal.

FIG. 13A illustrates a first feeder link system 1300 for a layered modulation signal. In this system 1300, the uplink signals 116 comprise two distinct feeder link signals 1302A, 1302B. Feeder link spot beam antennas 1304A, 1304B can be employed on the satellite 108 to reuse feeder link spectrum in order to not exceed bandwidth of the layered modulation on the downlink. The feeder link system 1300 includes a first feeder link antenna 1306A located within a first coverage area 1308A of the first feeder link spot beam antenna 1304A. A second feeder link antenna 1304B is located within a second coverage area 1308B of the second feeder link spot beam antenna 1304B. The first and second coverage areas 1308A, 1308B are distinct from one another and do not overlap. These signals 1302A, 1302B are formed on board the satellite 108 by each feeder link spot beam antenna 1304A, 1304B.

In this embodiment, the first feeder link antenna 1306A transmits the first feeder link signal 1302A at a first frequency. The first feeder link signal 1302A comprises the information that will be carried on the upper layer downlink signal 808A. The second feeder link antenna 1306B transmits the second feeder link signal 1302B at a second frequency. This feeder link signal 1302B comprises the information that will be carried on the lower layer downlink signal 808B. Although the two feeder link frequencies are in substantially the same frequency band, the use of spot beam antennas 1304A, 1304B with distinct coverage areas 1308A, 1308B prevents the first and second feeder link signals 1302A, 1302B from interfering. This feeder link system 1300 requires that the two feeder link signals 1302A, 1302B have sufficient isolation between them. This can be more difficult to achieve when applied to smaller regions (smaller countries where there may be insufficient space for the formation of two feeder link spot beams).

The transponders 107A, 107B (which can include conventional satellite receivers 1310A, 1310B) each receive one of feeder link signals 1302A, 1302B. The downlink layered signals 808A, 808B are formed by appropriate filtering, translation of each layer to its assigned downlink frequency, and adjustment of the layer power level in the respective receivers 1310A, 1310B. The assigned downlink frequencies are understood to result in either partial or complete signal bandwidth overlap between the layers. Following this each layered signal 808A, 808B is sent to the respective downlink amplifier 1312A, 1312B (which include one or more TWTAs that can be arranged in a power combiner, particularly for the upper layer signal 808A). In this example, separate satellite antennas 1314A, 1314B are used to transmit the upper layer downlink signal 808A and the lower layer downlink signal 808B, respectively, to substantially the same coverage area. The upper layer downlink signal 808A and the lower layer downlink signal 808B are combined in space to form the layered modulation signal. The user's IRD 500, 802 receives the two overlapping signals through the technique described in Utility application Ser. No. 09/844,401, is able to demodulate one or both of each layered signal 808A, 808B.

In this example, the amount of feeder link spectrum required to support transmission of the layered modulation downlink signal 808 is no more than the required downlink spectrum. This feeder link system 1300 retains the advantage of an asynchronous relationship between the downlink layered signals 808A, 808B and also retains the advantage of separate saturated satellite downlink amplifiers 1312A, 1312B for each layer. The asynchronous (non-coherent) relationship between the two layered signals 808A, 808B allows them to operate at different symbol rates and to use independent modulation formats and to use independent forward error correction techniques. The use of separate saturated downlink amplifiers 1312A, 1312B allows the upper layer amplifier 1312A to be significantly lower in saturated output power than would otherwise be required. This significantly reduces the linearity requirements on these amplifiers 1312A, 1312B. It should also be noted that the two transponders 107A, 107B of the feeder link system 1300 can be on a common satellite 108 as shown or exist on different satellites 108A, 108B, although level control of the signals is more easily achieved if the transponders 107A, 107B are on the same satellite 108.

Figure 13B:
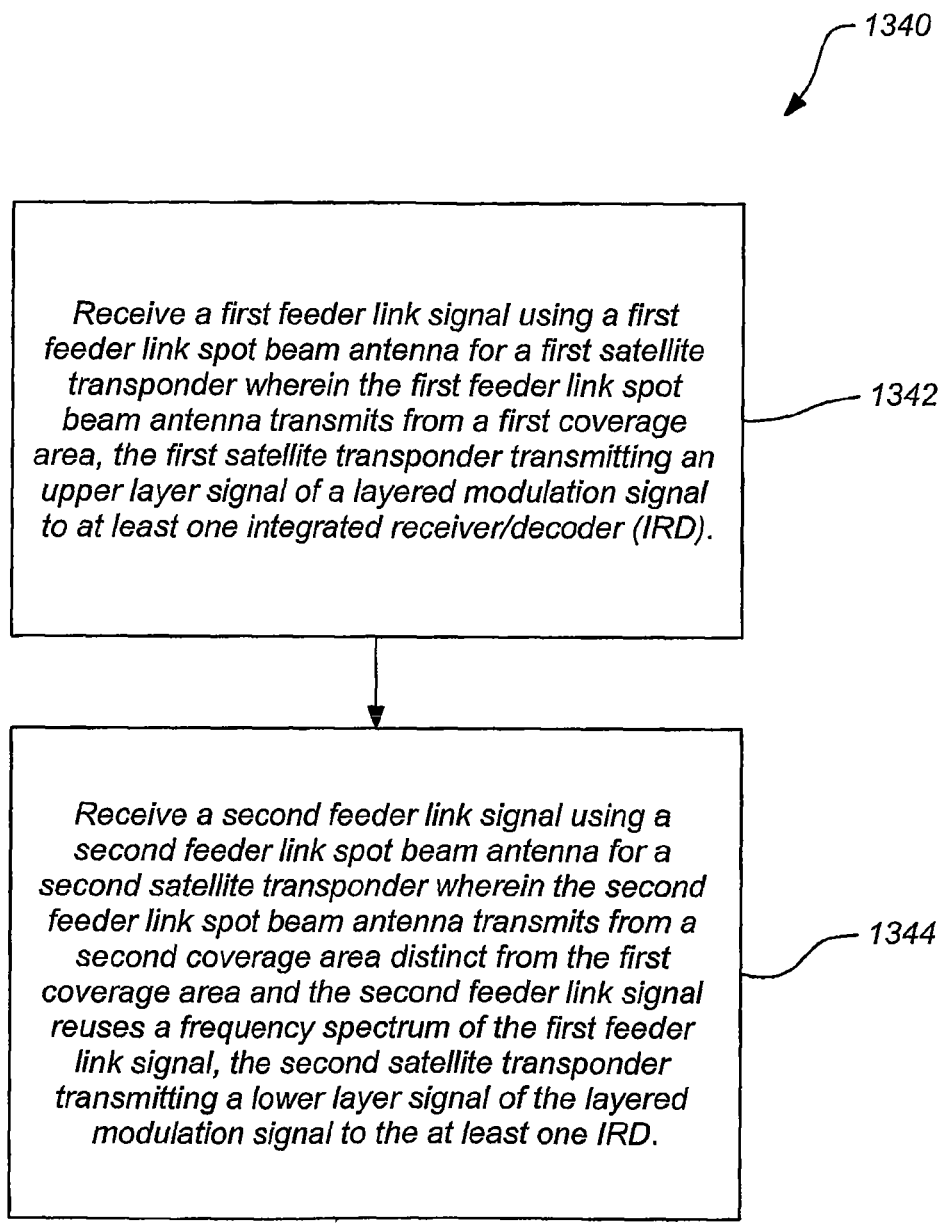
FIG. 13B is a flowchart of an exemplary method of the invention for the first feeder link architecture.

FIG. 13B is a flowchart of an exemplary method 1340 of the invention for the first feeder link architecture. At step 1342, a first feeder link signal is received using a first feeder link spot beam antenna for a first satellite transponder wherein the first feeder link spot beam antenna transmits from a first coverage area. The first satellite transponder is for transmitting an upper layer signal of a layered modulation signal to at least one integrated receiver/decoder (IRD). Next at step 1344, a second feeder link signal is received using a second feeder link spot beam antenna for a second satellite transponder wherein the second feeder link spot beam antenna transmits from a second coverage area distinct from the first coverage area and the second feeder link signal reuses a frequency spectrum of the first feeder link signal. The second satellite transponder is for transmitting a lower layer signal of the layered modulation signal to the at least one IRD. The method 1340 can be further modified consistent with the feeder link system 1300 described above.

5.2 Feeder Link Antenna Beam Discrimination

Figure 14A:
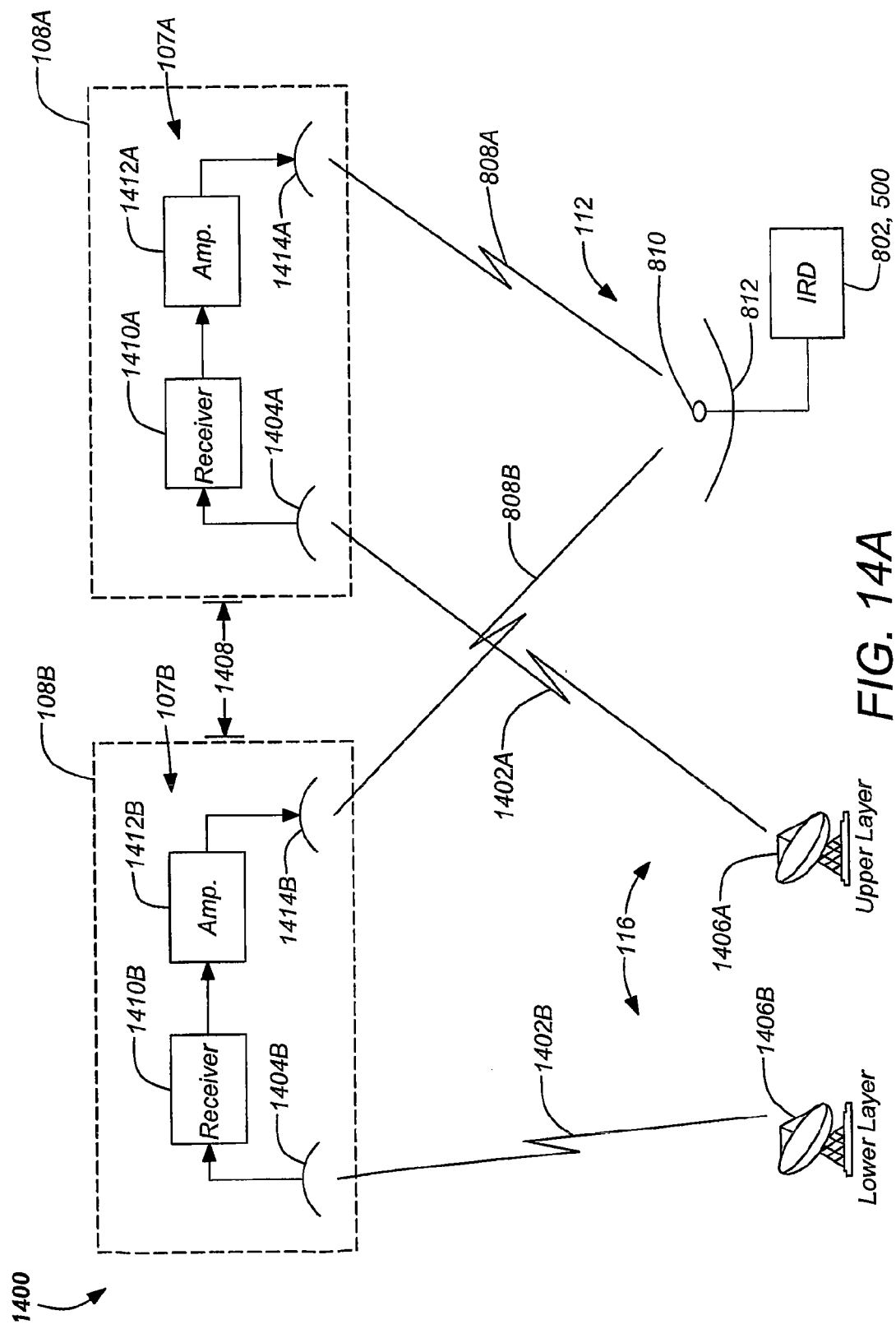
FIG. 14A illustrates a second feeder link architecture for a layered modulation signal.

FIG. 14A illustrates a second feeder link system 1400 for a layered modulation signal. This system 1400 employs feeder link signal discrimination in order to reuse feeder link spectrum to support layered modulation in the downlink signal 808A, 808B. In this case, the downlink layered signals 808A, 808B must be generated from two satellites 108A, 108B so that an orbital separation 1408 provides adequate feeder link signal discrimination. For example, the two satellites 108A, 108B can be in geosynchronous orbit, separated by an orbital separation 1408 of nominally 0.4 degrees of longitude. Very large feeder link antennas 1406A, 1406B are used to provide very narrow and highly focused beams for transmission to the satellites 108A, 108B. The large antennas 1406A, 1406B are typical of conventional feeder antennas, e.g. in the range of approximately 7 to 10 meters in diameter for the 17 Ghz feeder link band. Each of the feeder link signals 1402A, 1402B can be focused on the receive antenna 1404A, 1404B of its respective satellite 108A, 108B as shown and yet the orbital separation 1408 provides adequate isolation from the feeder link signal 1402A, 1402B to the other satellite 108A, 108B to allow frequency reuse. This allows both feeder link antennas 1406A, 1406B to transmit in the same portion of the frequency band and not interfere with one another. Embodiments of the present invention can apply the techniques employed in U.S. Utility application Ser. No. 10/305,490 related to feeder link antenna beam discrimination to implement layered modulation downlink signals 808A, 808B.

In this example, a first feeder link antenna 1406A transmits a first feeder link signal 1402A at a first frequency to a first transponder 107A of a first satellite 108A. A second feeder link antenna 1406B transmits a second feeder link signal 1402B at a second frequency to a second transponder 107B of a second satellite 108B. As with the previous feeder link system 1300 of FIG. 13, these two feeder link frequencies are considered to be very close together such that the one feeder link signal, e.g. 1402A is in the same portion of the feeder link frequency band that is occupied by the other feeder link signal, e.g. 1402B. However, the orbital separation 1408 is adequate to allow reuse in the feeder link frequency band.

Each satellite receiver 1410A, 1410B receives one feeder link signal 1402A, 1492B. The downlink layered signals 808A, 808B are formed by appropriate filtering, translation of each layer to its assigned downlink frequency and adjustment of the layer power level in the respective receivers 1410A, 1410B. The assigned downlink frequencies are understood to result in either partial or complete signal bandwidth overlap between the layers. Following this each layered signal 808A, 808B is sent to the respective downlink amplifier 1412A, 1412B (which include one or more TWTAs that can be arranged in a power combiner, particularly for the upper layer signal 808A). In this example, separate satellite antennas 1414A, 1414B are used to transmit the upper layer downlink signal 808A and the lower layer downlink signal 808B, respectively, to substantially the same coverage area. The upper layer downlink signal 808A and the lower layer downlink signal 808B are combined in space to form the layered modulation signal 808. The user's IRD 500, 802 receives the two overlapping signals through the technique described in Utility application Ser. No. 09/844,401, is able to demodulate one or both of each layered signal 808A, 808B.

In this example as well, the amount of feeder link spectrum required to support transmission of the layered modulation downlink signal 808 is no more than the required downlink spectrum. As in the first feeder link system 1300, this feeder link system 1400 retains the advantage of an asynchronous (non-coherent) relationship between the layered signals 808A, 808B, and retains the advantage of separate saturated satellite amplifiers 1412A, 1412B for each downlink signal 808A, 808B. The non-coherent relationship between the two layered signals 808A, 808B allows them to operate at different symbol rates and to use independent modulation formats and to use independent forward error correction techniques. The use of separate saturated downlink amplifiers 1412A, 1412B allows the upper layer amplifier 1412A to be significantly lower in saturated output power than would otherwise be required. This significantly reduces the linearity requirements on these amplifiers 1412A, 1412B.

Although this feeder link system 1400 requires the presence of two separate satellites 107A, 107B to cleanly receive the feeder link signals 1402A, 1402B and produce the layered modulation downlink signal 808, conventional feeder link antennas 1406A, 1406B can be used without spot beam receive antennas on the satellites 108A, 108B.

Figure 14B:
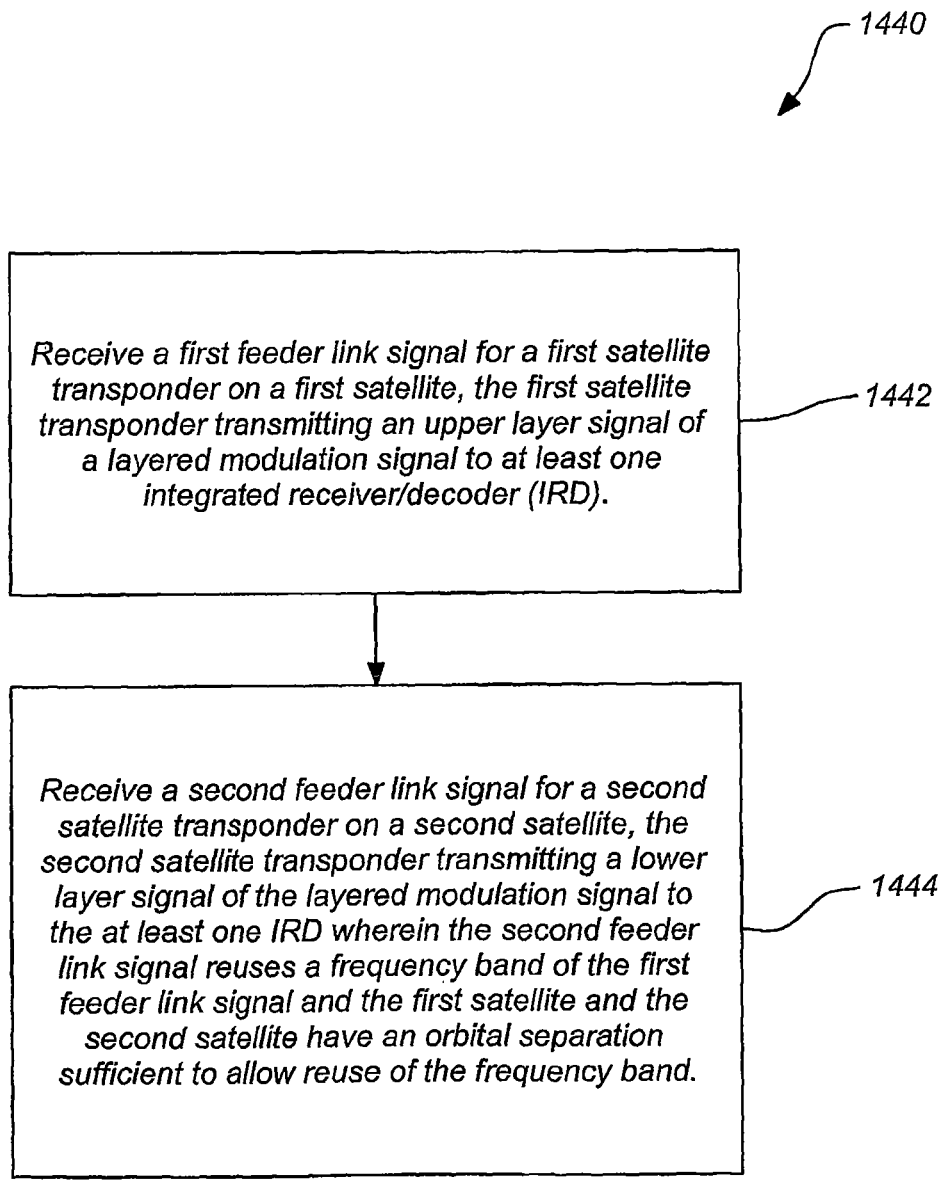
FIG. 14B is a flowchart of an exemplary method of the invention for the second feeder link architecture.

FIG. 14B is a flowchart of an exemplary method 1440 of the invention for the first feeder link architecture. At step 1442, a first feeder link signal for a first satellite transponder on a first satellite is received. The first satellite transponder is for transmitting an upper layer signal of a layered modulation signal to at least one integrated receiver/decoder (IRD). Next at step 1444, a second feeder link signal for a second satellite transponder on a second satellite is received wherein the second feeder link signal reuses a frequency band of the first feeder link signal and the first satellite and the second satellite have an orbital separation sufficient to allow reuse of the frequency band. The second satellite transponder is for transmitting a lower layer signal of the layered modulation signal to the at least one IRD. The method 1440 can be further modified consistent with the feeder link system 1400 described above.

5.3 Layered Modulation Feeder Link

Figure 15A:
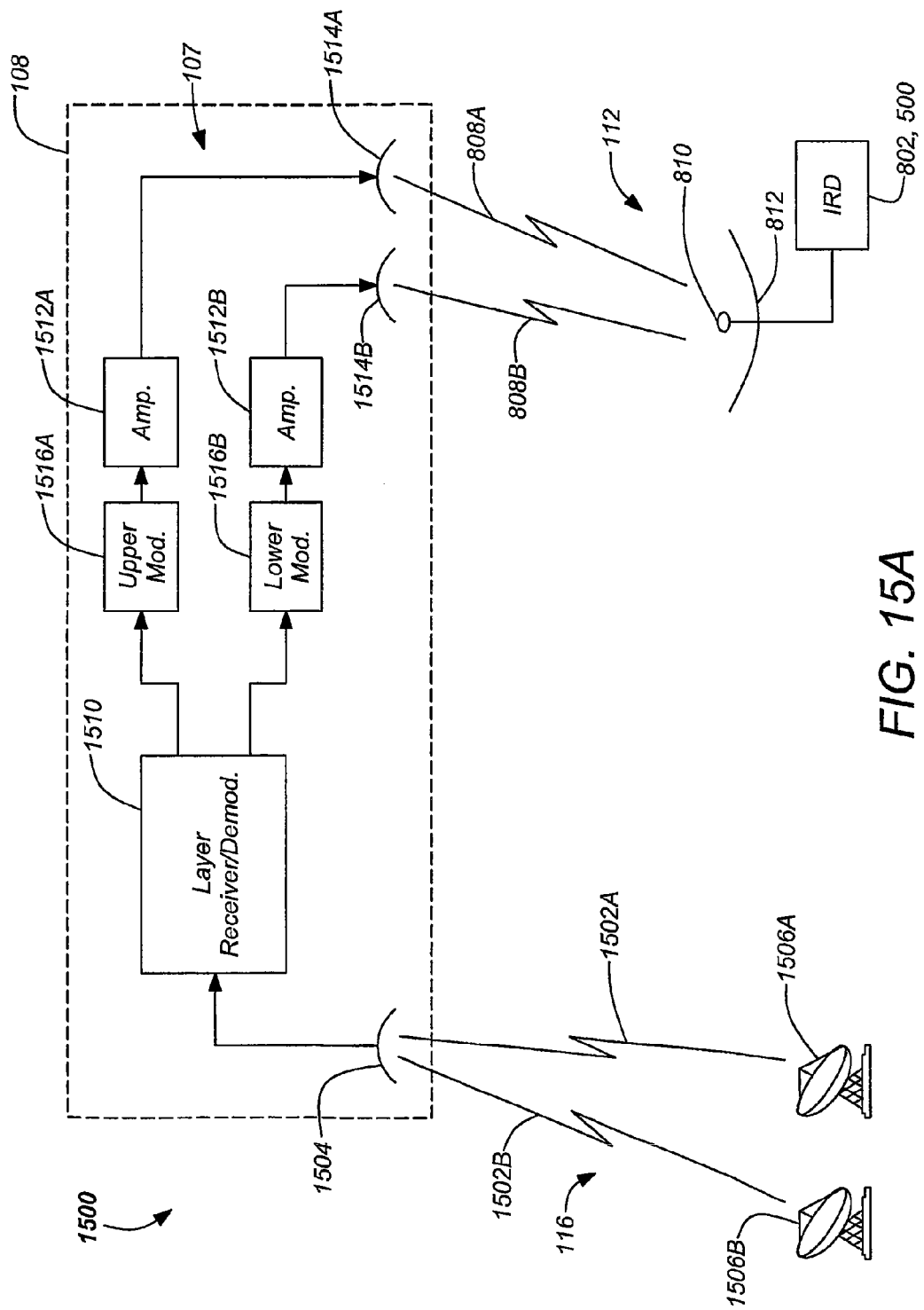
FIG. 15A illustrates a third feeder link architecture for a layered modulation signal.

FIG. 15A illustrates a third feeder link system 1500 for a layered modulation signal. In this case, a feeder link layered modulation signal comprising an upper layer feeder link signal 1502A and a lower layer feeder link signal 1502B is generated at the feeder link station (uplink center 104) and then transmitted up to the satellite 108. Combining of the two feeder link signals 1502A, 1502B can be performed in space as shown in FIG. 15A, with a separate modulator, upconverter and high power amplifier chain for each feed link antenna 1506A, 1506B for each uplink signal 1502A, 1502B in the uplink center 104. Alternately, the two feeder link signals 1502A, 1502B can be combined in a single uplink modulator and processed through a highly linear upconverter/high power amplifier combination in the uplink center 104 to a single feeder link antenna 1506 (not shown).

A layered modulation receiver/demodulator 1510 on board the satellite receives and separates the two layered feeder link signals 1502A, 1502B into their individual associated bit streams. The output bit streams of the receiver/demodulator 1510 is coupled to modulators 1516A, 1516B (that can be combined in a single unit). A first modulator 1516A generates an upper layer signal 808A that is appropriately filtered, translated to its assigned downlink frequency and power level adjusted before being coupled to a first downlink amplifier 1512A and satellite antenna 1514A for transmission to an IRD 500, 802. A second modulator 1516B generates a lower layer signal 808B that is also appropriately filtered, translated to its assigned downlink frequency and power level adjusted before being coupled to a second downlink amplifier 1512B and satellite antenna 1514B for transmission to the IRD 500, 802. The upper and lower layer signals 808A, 808B are combined in space to form the layered modulation downlink signal. The assigned downlink frequencies are understood to result in either partial or complete signal bandwidth overlap between the layers. The user's layered modulation receiver 802 can receive the two signals 808A, 808B and, through the technique described in Utility application Ser. No. 09/844, 401, is able to demodulate each layer.

As with the previous feeder link systems 1300, 1400, in the present feeder link system 1500 the amount of feeder link spectrum required to support transmission of the layered modulation downlink signal 808 is no more than the required downlink spectrum. This feeder link system 1500 retains the advantage of an asynchronous relationship between the downlink layered signals 808A, 808B and also retains the advantage of separate saturated satellite downlink amplifiers 1512A, 1512B for each layer. The asynchronous (non-coherent) relationship between the two layered signals 808A, 808B allows them to operate at different symbol rates and to use independent modulation formats and to use independent forward error correction techniques. The use of separate saturated downlink amplifiers 1512A, 1512B allows the upper layer amplifier 1512A to be significantly lower in saturated output power than would otherwise be required. This significantly reduces the linearity requirements on these amplifiers 1512A, 1512B.

Although the feeder link system 1500 requires a layered modulation demodulator and layered modulation modulator on board a single satellite, there are no requirements on the relative locations of the feed link antenna 1506A, 1506B (so long as they each transmit to the satellite 108, e.g. CONUS coverage and so long as there is adequate control on the relative received power levels of the two layered signals at the satellite 108). The demodulation and remodulation function on board the satellite 108 can be eliminated if a highly linear satellite amplifier with sufficient output power can be found. In this case, a bent pipe satellite repeater could be used.

Figure 15B:
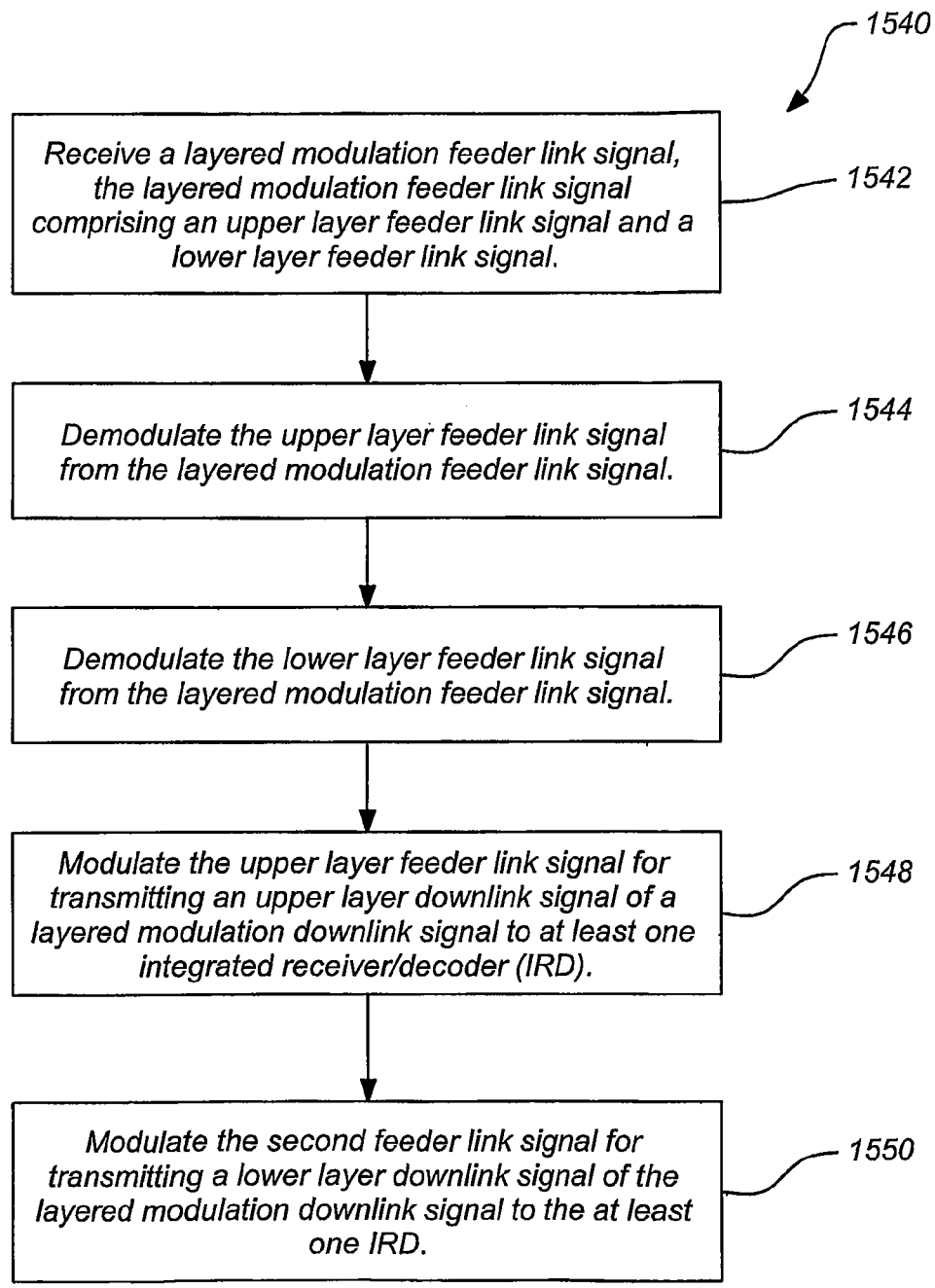
FIG. 15B is a flowchart of an exemplary method of the invention for the third feeder link architecture.

FIG. 15B is a flowchart of an exemplary method 1540 of the invention for the third feeder link system 1500. At step 1542, a layered modulation feeder link signal is received, the layered modulation feeder link signal comprising an upper layer feeder link signal and a lower layer feeder link signal. Next at step 1544, the upper layer feeder link signal is demodulated from the layered modulation feeder link signal. At step 1546, the lower layer feeder link signal is demodulated from the layered modulation feeder link signal. At step 1548, the upper layer feeder link signal is modulated for transmitting an upper layer downlink signal of a layered modulation downlink signal to at least one integrated receiver/decoder (IRD). Finally at step 1550, the second feeder link signal is modulated for transmitting a lower layer downlink signal of the layered modulation downlink signal to the at least one IRD. The method 1540 can be further modified consistent with the feeder link system 1500 described above.

5.4 Higher Order Modulation Feeder Link

Figure 16A:
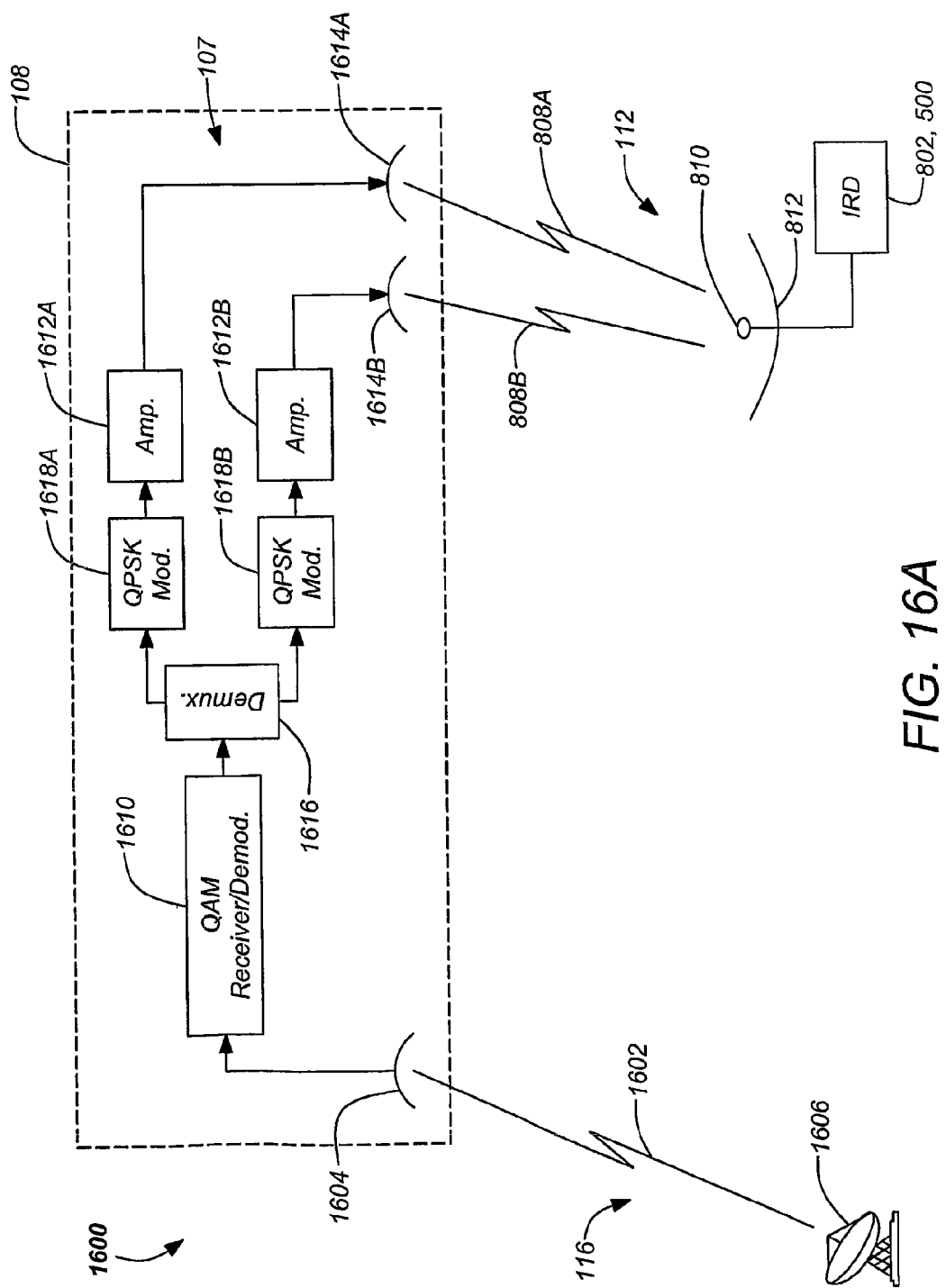
FIG. 16A illustrates a fourth feeder link architecture for a layered modulation signal.

FIG. 16A illustrates a fourth feeder link system 1600 for a layered modulation signal 808. In this case, a conventional high order synchronous modulation, such as 16QAM, is used for the feeder link signal 1602. The feeder link signal 1602 comprises a higher order synchronous modulation than either the upper layer signal 808A or the lower layer signal 808B of the downlink. Thus, the bit stream throughput of the feeder link signal is at least as high as the combined bit stream throughput of the upper and lower layer downlink signals 808A, 808B. A high power combiner may be used in the transponder 107 to combine the output from more than one power amplifier if it is necessary to provide power levels in excess of those that can be achieved using a single power amplifier.

A 16QAM (in this example) receiver/demodulator 1610 is used on board the satellite 108 to receive and demodulate the data stream from the feeder link signal 1602. A demultiplexer 1616 is then used to separate the higher speed feeder link bit stream into two slower bitstreams. These two bitstreams are each communicated to a lower order layered signal modulator 1618A, 1618B (shown in the FIG. 16A example as two QPSK modulators). The first lower order modulator 1618A applies the first bit stream to a carrier frequency and appropriately filters, translates it to its assigned downlink frequency and adjusts the layer power level to produce the upper layer signal 808A for the downlink. Similarly, the second lower order modulator 1618B applies the second bit stream to a carrier frequency and appropriately filters, translates it to its assigned downlink frequency and adjusts the layer power level to produce the lower layer signal 808B for the downlink. The assigned downlink frequencies are understood to result in either partial or complete signal bandwidth overlap between the layers. Each signal 808A, 808B is then sent to a corresponding downlink amplifier 1612A, 1612B and the two layered signals 808A, 808B are then combined in space. The user's layered modulation receiver 802 can receives the two layered signals 808A, 808B and, through the technique described in Utility application Ser. No. 09/844,401, is able to demodulate each layer.

As with all the previous feeder link systems 1300, 1400, 1500, in the present feeder link system 1600 the amount of feeder link spectrum required to support transmission of the layered modulation downlink signal 808 is no more than the required downlink spectrum. However, this feeder link system 1600 results in a synchronous relationship between the downlink layered signals 808A, 808B and the signals 808A, 808B are transmitted at the same symbol rate. However, the system 1600 allows the use of saturated downlink amplifiers 1612A, 1612B. The use of separate saturated downlink amplifiers 1612A, 1612B allows the upper layer amplifier 1612A to be significantly lower in saturated output power than would otherwise be required. This significantly reduces the linearity requirements on these amplifiers 1612A, 1612B.

Although this feeder link system 1600 requires the upper and lower layer signals 808A, 808B to be synchronous, the system 1600 can provide a corresponding downlink channel with a throughput at the level of 16QAM. Conventional techniques for providing 16QAM throughput require very high power and highly linear satellite amplifiers to transmit a conventional 16QAM signal from a satellite to a ground receiver. This system 1600 allows the use of multiple lower power amplifiers operating in a non-linear fashion to achieve the same throughput.

Figure 16B:
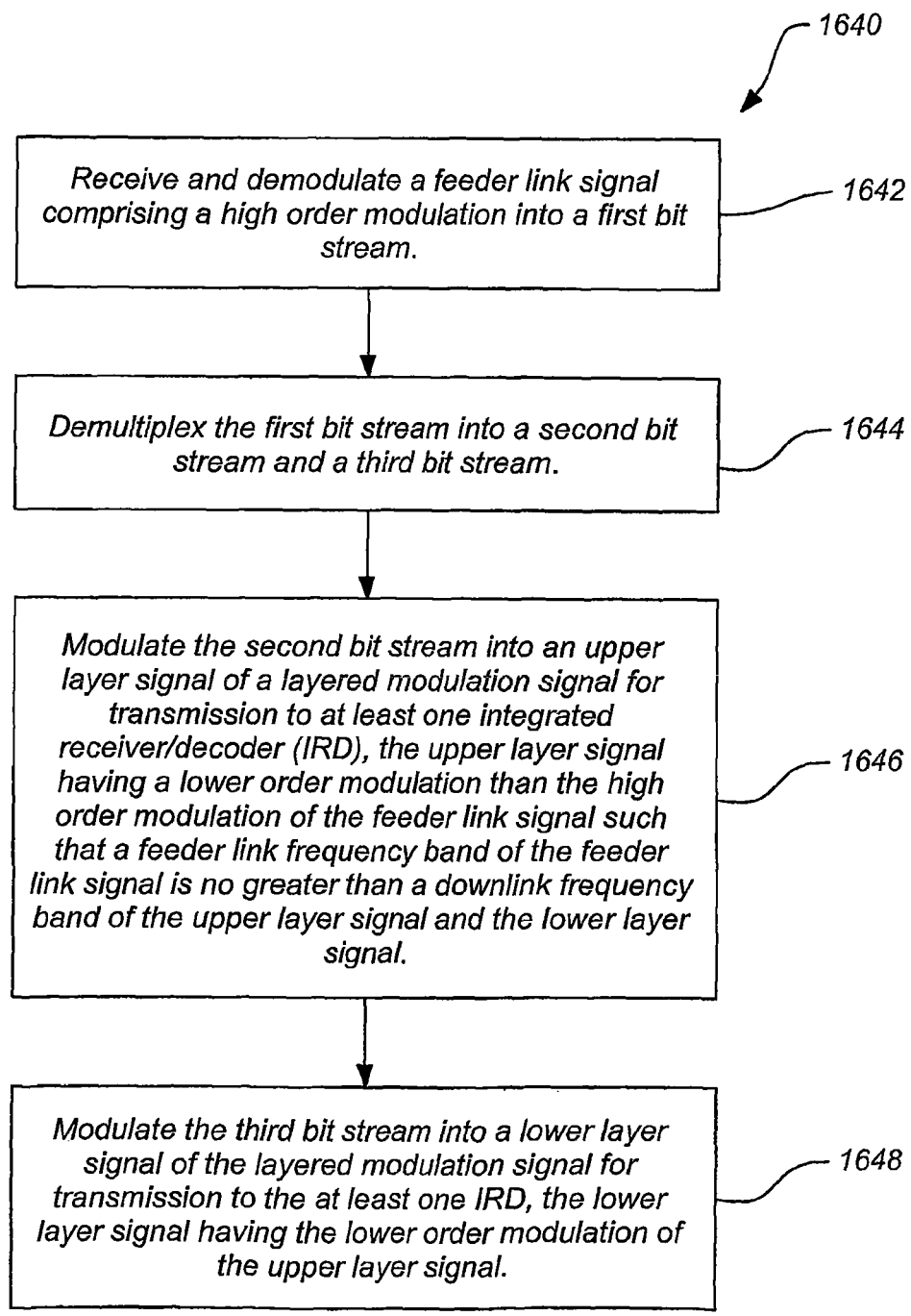
FIG. 16B is a flowchart of an exemplary method of the invention for the fourth feeder link architecture.

FIG. 16B is a flowchart of an exemplary method 1640 of the invention for the fourth feeder link system 1600. First at step 1642, a feeder link signal comprising a high order modulation is received and demodulated into a first bit stream. At step 1644, the first bit stream is demultiplexed into a second bit stream and a third bit stream. At step 1646, the second bit stream is modulated into an upper layer signal of a layered modulation signal for transmission to at least one integrated receiver/decoder (IRD), the upper layer signal having a lower order modulation than the high order modulation of the feeder link signal such that a feeder link frequency band of the feeder link signal is no greater than a downlink frequency band of the upper layer signal and the lower layer signal. Finally at step 1648, the third bit stream is modulated into a lower layer signal of the layered modulation signal for transmission to the at least one IRD, the lower layer signal having the lower order modulation of the upper layer signal. The method 1640 can be further modified consistent with the feeder link system 1600 described above.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A system for transmitting signals to a receiver, comprising:
   a demodulator for receiving and demodulating a feeder link signal, wherein the feeder link signal comprises a layered modulation feeder link signal including an upper layer feeder link signal and a lower layer feeder link signal, the demodulator comprising a layered modulation demodulator;
   a module, for generating an upper layer signal of a layered modulation downlink signal and a lower layer signal of the layered modulation downlink signal from the received feeder link signal;
   a first modulator, for modulating the upper layer feeder link signal to produce a modulated upper layer signal of the layered modulation downlink signal for transmission to the receiver; and
   a second modulator, for modulating the lower layer feeder link signal to produce a modulated lower layer signal of the layered modulation downlink signal for transmission to the receiver;
   wherein the upper layer feeder link signal and the lower layer feeder link signal are transmitted from a common location or each transmitted from a different location.

2. The system of claim 1, wherein a first frequency bandwidth of the upper layer downlink signal partially overlaps a second frequency bandwidth of the lower layer downlink signal.

3. The system of claim 1, wherein a first frequency bandwidth of the upper layer downlink signal completely overlaps a second frequency bandwidth of the lower layer downlink signal.

4. The system of claim 1, wherein the upper layer feeder link signal and the lower layer feeder link signal are coherently transmitted to the layered modulation receiver/demodulator.

5. The system of claim 1, wherein the upper layer feeder link signal and the lower layer feeder link signal are non-coherently transmitted to the layered modulation receiver/demodulator.

6. The system of claim 1, wherein the upper layer downlink amplifier includes a power combiner.

7. The system of claim 1, wherein at least one of the upper layer feeder link signal and the lower layer feeder link signal are power level adjusted to maintain a relative power level between the upper layer signal and the lower layer signal for reception.

8. The system of claim 1, wherein the modulated upper layer signal is non-coherent with the modulated lower layer signal.

9. A method of transmitting signals to a receiver, comprising:
   receiving and demodulating a feeder link signal, wherein the feeder link signal comprises an upper layer feeder link signal and a lower layer feeder link signal;
   generating an upper layer signal of a layered modulation downlink signal and a lower layer signal of the layered modulation downlink signal, comprising the steps of:
   demodulating the upper layer feeder link signal from the layered modulation feeder link signal;
   demodulating the lower layer feeder link signal from the layered modulation feeder link signal; and
   modulating the upper layer signal to produce a modulated upper layer signal of the layered modulation downlink signal, comprising the step of modulating the demodulated upper layer feeder link signal; and
   modulating the lower layer signal to produce a modulated lower layer signal of the layered modulation downlink signal comprises the step of modulating the demodulated lower layer feeder link signal;
   wherein the upper layer feeder link signal and the lower layer feeder link signal are transmitted from a common location or each transmitted from a different location.

10. The method of claim 9, wherein a first frequency bandwidth of the upper layer downlink signal partially overlaps a second frequency bandwidth of the lower layer downlink signal.

11. The method of claim 9, wherein a first frequency bandwidth of the upper layer downlink signal completely overlaps a second frequency bandwidth of the lower layer downlink signal.

12. The method of claim 9, wherein the upper layer feeder link signal and the lower layer feeder link signal are coherently transmitted to the layered modulation receiver/demodulator.

13. The method of claim 9, wherein the upper layer feeder link signal and the lower layer feeder link signal are non-coherently transmitted to the layered modulation receiver/demodulator.

14. The method of claim 9, wherein the upper layer downlink amplifier includes a power combiner.

15. The method of claim 9, wherein at least one of the upper layer feeder link signal and the lower layer feeder link signal are power level adjusted to maintain a relative power level between the upper layer signal and the lower layer signal for reception.

16. The method of claim 9, wherein the modulated upper layer signal is non-coherent with the modulated lower layer signal.

17. A system for transmitting signals to a receiver, comprising:
   a demodulator, for receiving and demodulating a feeder link signal into a first bit stream;
   a module, for generating an upper layer signal of a layered modulation downlink signal and a lower layer signal of the layered modulation downlink signal from the received feeder link signal, the module comprising a demultiplexer for demultiplexing the first bit stream into a second bit stream and a third bit stream;
   a first modulator, for modulating the upper layer signal to produce a modulated upper layer signal of the layered modulation downlink signal for transmission to the receiver, the first modulator comprising a first lower order modulator for modulating the second bit stream into the upper layer signal of the layered modulation downlink signal; and
   a second modulator, for modulating the lower layer signal to produce a modulated lower layer signal of the layered modulation downlink signal for transmission to the receiver, the second modulator comprising a second lower order modulator for modulating the third bit stream into a lower layer signal of the layered modulation signal;
   wherein the feeder link signal comprises a modulation of higher order than either the upper layer signal or the lower layer signal, and the modulated upper layer signal is non-coherent with the modulated lower layer signal.

18. The system of claim 17, wherein a first frequency bandwidth of the upper layer signal partially overlaps a second frequency bandwidth of the lower layer signal.

19. The system of claim 17, wherein a first frequency bandwidth of the upper layer signal completely overlaps a second frequency bandwidth of the lower layer signal.

20. The system of claim 17, wherein the higher order synchronous modulation comprises 16QAM and the lower order modulation comprises QPSK.

21. The system of claim 17, wherein an amplifier system for the upper layer downlink signal includes a power combiner.

22. The system of claim 17, wherein at least one of the upper layer feeder link signal and the lower layer feeder link signal are power level adjusted to maintain a relative power level between the upper layer signal and the lower layer signal for reception.

23. A method of transmitting signals to a receiver, comprising:
   receiving and demodulating a feeder link signal to produce a first bit stream;
   demultiplexing the first bit stream into a second bit stream and a third bit stream;
   generating an upper layer signal of a layered modulation downlink signal and a lower layer signal of the layered modulation downlink signal from the received feeder link signal;
   modulating the upper layer signal to produce a modulated upper layer signal of the layered modulation downlink signal, comprising the step of modulating the second bit stream into the upper layer signal of the layered modulation signal;
   modulating the lower layer signal to produce a modulated lower layer signal of the layered modulation downlink signal, comprising the step of modulating the third bit stream into the lower layer signal of the layered modulation signal for transmission to the at least one receiver;
   wherein the feeder link signal comprises a modulation of higher order than either the upper layer signal or the lower layer signal, and the modulated upper layer signal is non-coherent with the modulated lower layer signal.

24. The method of claim 23, wherein a first frequency bandwidth of the upper layer signal partially overlaps a second frequency bandwidth of the lower layer signal.

25. The method of claim 23, wherein a first frequency bandwidth of the upper layer signal completely overlaps a second frequency bandwidth of the lower layer signal.

26. The method of claim 23, wherein the higher order synchronous modulation comprises 16QAM and the lower order modulation comprises QPSK.

27. The method of claim 23, wherein an amplifier system for the upper layer downlink signal includes a power combiner.

28. The method of claim 23, wherein at least one of the first feeder link signal and the second feeder link signal are power level adjusted to control a relative power level between the upper layer signal and the lower layer signal.

* * * * *